US009491620B2

(12) United States Patent
Edge et al.

(10) Patent No.: US 9,491,620 B2
(45) Date of Patent: Nov. 8, 2016

(54) ENABLING SECURE ACCESS TO A DISCOVERED LOCATION SERVER FOR A MOBILE DEVICE

(71) Applicant: QUALCOMM Incorporated, San Diego, CA (US)

(72) Inventors: Stephen William Edge, Escondido, CA (US); Andreas Klaus Wachter, Menlo Park, CA (US); Philip Michael Hawkes, Warimoo (AU)

(73) Assignee: QUALCOMM Incorporated, San Diego, CA (US)

( * ) Notice: Subject to any disclaimer, the term of this patent is extended or adjusted under 35 U.S.C. 154(b) by 4 days.

(21) Appl. No.: 13/762,280

(22) Filed: Feb. 7, 2013

(65) Prior Publication Data

US 2013/0212663 A1    Aug. 15, 2013

Related U.S. Application Data

(60) Provisional application No. 61/597,713, filed on Feb. 10, 2012.

(51) Int. Cl.
*H04L 29/06* (2006.01)
*H04W 12/06* (2009.01)
(Continued)

(52) U.S. Cl.
CPC .......... *H04W 12/06* (2013.01); *H04L 63/0823* (2013.01); *H04L 63/107* (2013.01); *H04W 4/02* (2013.01); *H04W 4/20* (2013.01); *H04W 8/02* (2013.01); *H04W 8/06* (2013.01)

(58) Field of Classification Search
CPC ....... H04W 12/06; H04W 8/02; H04W 8/06; H04W 4/20; H04W 4/02; H04L 63/0823; H04L 63/107

USPC .......................................................... 726/10
See application file for complete search history.

(56) References Cited

U.S. PATENT DOCUMENTS

| | | | |
|---|---|---|---|
| 6,986,040 B1 * | 1/2006 | Kramer et al. ............... | 713/155 |
| 7,266,681 B1 * | 9/2007 | Janes ..................... | H04L 63/20 |
| | | | 713/150 |

(Continued)

FOREIGN PATENT DOCUMENTS

| | | |
|---|---|---|
| EP | 1519604 A1 | 3/2005 |
| EP | 1653656 A2 | 5/2006 |

(Continued)

OTHER PUBLICATIONS

RSA Laboratories, "PKCS #1 v2.1: RSA Cryptography Standard", Jun. 14, 2002, pp. 1-61.*

(Continued)

*Primary Examiner* — Jeffrey D Popham
(74) *Attorney, Agent, or Firm* — Kilpatrick Townsend & Stockton LLP

(57) ABSTRACT

A method for obtaining a secure connection between a first server and a client. The method may comprise establishing a secure communication session between a second server and the client, wherein the second server is trusted by the first server, and the second server is configured to authenticate the client. The client may receive a client token, wherein the client token contains data associated with the first server, the second server, the client, and a digital signature. Then, the client may request secure communication access to the first server, wherein the request includes transferring the client token to the first server. Finally, the client may receive a grant of secure communication access to the first server based on authentication of the client by the first server, wherein the authentication is based on the client token validating the client and the digital signature validating the client token.

39 Claims, 13 Drawing Sheets

(51) Int. Cl.
  *H04W 4/02* (2009.01)
  *H04W 4/20* (2009.01)
  *H04W 8/02* (2009.01)
  *H04W 8/06* (2009.01)

(56) References Cited

U.S. PATENT DOCUMENTS

| | | | |
|---|---|---|---|
| 8,027,662 B1* | 9/2011 | Miller | H04L 67/18 455/17 |
| 8,135,796 B1 | 3/2012 | Slaughter et al. | |
| 2002/0138632 A1 | 9/2002 | Bade et al. | |
| 2003/0120611 A1* | 6/2003 | Yoshino et al. | 705/67 |
| 2004/0059941 A1* | 3/2004 | Hardman et al. | 713/201 |
| 2007/0135089 A1 | 6/2007 | Edge et al. | |
| 2008/0109650 A1* | 5/2008 | Shim et al. | 713/151 |
| 2010/0234022 A1 | 9/2010 | Winterbottom | |
| 2010/0318802 A1 | 12/2010 | Balakrishnan | |
| 2011/0136468 A1* | 6/2011 | McNamara et al. | 455/406 |
| 2011/0296513 A1 | 12/2011 | Kasad | |
| 2012/0264448 A1 | 10/2012 | Wachter et al. | |

FOREIGN PATENT DOCUMENTS

| | | |
|---|---|---|
| TW | 480864 | 3/2002 |
| WO | 03065754 A1 | 8/2003 |
| WO | 2006104352 A1 | 10/2006 |
| WO | 2007035736 A2 | 3/2007 |
| WO | 2012087435 A1 | 6/2012 |

OTHER PUBLICATIONS

International Search Report and Written Opinion—PCT/US2013/025446—ISA/EPO—Aug. 28, 2013.
Qualcomm: "User Plane Location Protocol Draft Version 2.1 OMA-TS-ULP-V2_0-20120209", OMA, Feb. 9, 2012 (Feb. 9, 2012), pp. 1-370, XP002710498, Retrieved from the Internet : URL: http://memberopenmobilealliance.org/ftp/Public_documents/LOC/2012/OMA-LOC-2012-0028-CR_SUPL_2.1_TS_ULP_Security.zip.
Watcher A., et al., "Supl 2.1 TS ULP Security", OMA, Qualcomm, Feb. 9, 2012 (Feb. 9, 2012), pp. 1-3, XP002710493, Retrieved from the Internet : URL:http://member.openmobileallinace.org/ftp/public_docuemnts/LOC/2012/OMA-LOC-2012-0028-CR_SUPL_2.1_TS_ULP_Security.zip.
Taiwan Search Report—TW102105614—TIPO—Feb. 12, 2015.

* cited by examiner

Method for Obtaining a Secure Connection between a First Server and a Client

H-SLP authorization of one or more D-SLPs on Request

Unsolicited H-SLP authorization of one or more D-SLPs

SET Obtaining Authenticated Location Service from a D-SLP

D-SLP locating a SET

SET Token

| Parameter | Value/Description |
|---|---|
| SET Token Content | Provides the SET Token used to authenticate the SET vis-à-vis a D-SLP. |
| > SET Token Body | The Body of the SET Token |
| >>SET Id | The Id of the SET. |
| >>SLP Id | The Id of the authorizing SLP |
| >>D-SLP Id | The Id of the D-SLP |
| >>SET Position | The position of the SET when D-SLP authorization was provided. |
| >>time | The time when D-SLP authorization begins. |
| >>duration | The duration of the D-SLP authorization. |
| >>SLP Name | SLP Name (as per [IETF RFC 5280]). |
| >>SLP Unique ID | SLP Unique Id (as per [IETF RFC 5280]). |
| >>public key | The public key for the SLP Signature. |
| >Algorithm Identifier | The algorithm identifier is used to identify a cryptographic algorithm. The OBJECT IDENTIFIER component identifies the algorithm such as DSA with SHA-1. The contents of the optional parameters field will vary according to the algorithm identified. Algorithm Identifier uses the conventions defined in section 4.1 of RFC 5280 [IETF RFC 5280]. |
| >SLP Signature | The SLP Signature contains a digital signature computed upon the ASN.1 PER encoded SET Token Body (see [IETF RFC 5280]). The ASN.1 PER encoded sET-Token-Body is used as the input to the signature function. The signature value is encoded as a BIT STRING and included in the sLPSignature field. |

FIG. 6A

SLP Certificate

160

| | |
|---|---|
| SLP Certificate | Can be of type:<br>·     BIT STRING<br>·     URI<br><br>If defined as BIT STRING, the format of SLP Certificate is as per X.509.<br>If defined as URI, the URI provides an external reference to the SLP Certificate.<br><br>Certificate is as defined in RFC 5280 section 4.1 [IETF RFC 5280]. The first certificate in the sequence provides or certifies the public key and associated algorithm for the SET-Token-Content. Each succeeding certificate certifies the public key and associated algorithm for the preceding certificate. DER encoding is used to align with X.509 certificate encoding and enable reuse of existing certificates. |

FIG. 6B

ENABLING SECURE ACCESS TO A DISCOVERED LOCATION SERVER FOR A MOBILE DEVICE

CROSS-REFERENCE TO RELATED APPLICATION

This application claims the benefit of U.S. Provisional App. No. 61/597,713 filed Feb. 10, 2012, Enabling Secure Access to a Discovered Location Server for Location Service Users, which is hereby incorporated by reference in its entirety.

BACKGROUND

Aspects of the disclosure relate to location-based services for mobile wireless devices. In particular, various aspects of the disclosure relate to Secure User Plan Location (SUPL) technology.

Location services for mobile wireless devices enable the current location and optionally speed and heading of a mobile wireless device to be obtained and provided to the wireless device (e.g. to an application running on the wireless device or to the user of the wireless device) or to some third party. Examples of a third party may include an emergency services provider (e.g. in the case of an emergency call from the wireless device) or some external provider of commercial services that depend on knowing the wireless device's current or previous location. For wireless devices that may access different types of wireless communication network, location services may be supported using a location server that can be accessed from and in some cases may be resident within the wireless network currently being accessed by the wireless terminal. The role of the location server may be (i) to assist the wireless terminal to make appropriate location related measurements (e.g. measurements of radio signals from base stations in the serving wireless network or measurements of various global navigation satellites) and, in some cases, (ii) to compute the wireless terminal's location based on these measurements. The location server may also be used to relay a wireless device's location to entities authorized to receive the location and convey the wireless device's location to the wireless device in the event that the location server rather than wireless device had computed the location.

Current user plane location services, such as the Secure User Plane Location (SUPL) service defined by the Open Mobile Alliance (OMA), derive their security from mutual authentication between a target mobile device (e.g. a SUPL Enabled Terminal (SET)) and a location server (e.g. a SUPL Location Platform (SLP)) in which each party verifies the identity of the other party in a fully reliable manner. After mutual authentication, target device and server are able to engage in a secure communication that may be encrypted to prevent interception by other entities. Additionally, subsequent authorization of the target device by the server can be required in the case that the target device is also the client for any location services. Secure communication can be required to protect sensitive location and user data that may enable provision of location services by the server such as transfer of assistance data to the target device and derivation of the target device location. By performing mutual authentication, a mobile device can be assured that the location server is who it claims to be and not some other entity who may abuse location and other information obtained from the mobile device. Similarly, the location server will know the identity of the mobile device and can make use of this (i) to provide only the services that device is entitled to (e.g. services that may have been previously subscribed to), (ii) to correctly bill the mobile device's user or home network operator for services provided and/or (iii) to correctly provide the mobile device's location to entities authorized (e.g. by the mobile device's user) to receive this.

A home location server (e.g. a Home SLP (H-SLP) in the case of SUPL) is a location server permanently affiliated with a number of target devices (e.g., based on service subscription). A home location server would sometimes belong to a target device's home network operator in the case of mobile wireless devices. A location server without a pre-provisioned permanent affiliation with a set of target devices may be referred to as a discovered location server. In the case of SUPL, a discovered location server is referred to as a Discovered SLP (D-SLP). A discovered location server could typically be found by or provided to a target device based on its current location, currently used access network(s) and/or the current date and time and could belong to or be associated with a non-home network operator or some other non-operator provider of location services.

There are two classes of conventional SET-SLP authentication methods defined by OMA for SUPL versions 2.0, 2.1 and 3.0 which comprise either a Pre-Shared Key (PSK)-based method or a certificate based method.

The PSK-based conventional methods can include: a Generic Bootstrapping Architecture (GBA) based method which may be applicable to nearly all types of wireless and wireline access by a device; and a SUPL Encryption Key (SEK) based method, which may only be applicable to access to a WIMAX network by a device in some situations.

The certificate based conventional methods can include: an Alternative Client authentication (ACA) based method; a server certificate based method and a device certificate based method.

BRIEF SUMMARY

Various techniques are provided for enabling secure access to a discovered location server such as a SUPL D-SLP for mobile devices when conventional methods of authentication are not available. The embodiments described herein, use a client token method (e.g., SET Token method), which is a server-certificate based method to provide authentication.

A client token method can be utilized when a discovered location server is unable to authenticate a client target device because the identity of the client provided by the client target device during access to the discovered location server cannot be verified by the discovered location server due to lack of information required to confirm the authenticity of the identity of the client. For example, with SUPL, an H-SLP may be able to authenticate a SET using the ACA, device certificates or GBA based methods because the H-SLP is provisioned with the necessary information (e.g. a PSK in the case of GBA or a global client identity in the case of a device certificates or GBA method) and can associate a client device IP address with a global client identity in the case of ACA. In contrast, a D-SLP may not be able to use conventional authentication methods to authenticate a SET because it may lack this information or capability. For example, the ACA based method may not be appropriate, because the D-SLP may have no access to the association or binding between the SET identity and SET access network IP address. Further, a D-SLP may not be able to use the GBA based method, if the D-SLP does not have authorization to access the home network of the client. Additionally, the D-SLP may not be able to use device certificates, if the device identity of the client is unknown to the D-SLP.

The client token method (e.g., SET Token method) provides a mechanism when the discovered location server (e.g., D-SLP) is otherwise unable to authenticate the client (e.g., SET). Scenarios where this may be needed include those where GBA is not deployed or where ACA is not applicable. For example, this may occur if the access network used for D-SLP access does not meet ACA requirements, such as supporting a spoofing free network environment and/or enabling the binding of SET IP address to SET identity to be verified.

According to some embodiments, the H-SLP can send the SET Token to the SET as part of D-SLP authorization, as illustrated in FIGS. 4A-C. Then, the SET can include the SET Token in any initial SUPL message sent to the D-SLP during session establishment, as illustrated in FIGS. 5A-C. The SET Token can be defined for each authorized D-SLP. The SET Token can contain SET and H-SLP related information digitally signed by the H-SLP.

The SET Token method can allow the D-SLP to authenticate the SET to authorize or reject access. The SET Token may also include non-security related information such as for example a billing code. By using the SET Token, an H-SLP and D-SLP can securely exchange information required for authentication, authorization, billing and/or other purposes.

According to some embodiments, a method for obtaining a secure connection between a first server and a client is disclosed. The method may comprise establishing a secure communication session between a second server and the client, wherein the second server is trusted by the first server, and the second server is configured to authenticate the client. Additionally, the client may receive a client token using the secure communication session, wherein the client token is defined for the first server and contains data associated with the first server, the second server, the client, and a digital signature. Then the client may request secure communication access to the first server, wherein the request includes transferring the client token to the first server. Finally, the client may receive grant of secure communication access to the first server based on authentication of the client by the first server, wherein the authentication is based on the client token validating the client and the digital signature validating the client token.

For example, by providing the D-SLP with the digital signature of the H-SLP, the D-SLP can authenticate the SET Token. Then, the D-SLP can use the SET Token for authentication of the SET. According to another embodiment, the H-SLP can also send its digital certificate (e.g., public key certificate, SLP Certificate) to the SET during D-SLP authorization which the SET can then send to the D-SLP during session establishment to authenticate the digital signature of the H-SLP.

According to another embodiment, a client for obtaining a secure connection with a first server, the client comprises: one or more processors; and memory storing computer-readable instructions that, when executed by the one or more processors, may cause the client to: establish a secure communication session between a second server and the client, wherein the second server is trusted by the first server, and the second server is configured to authenticate the client; receive a client token using the secure communication session, wherein the client token is defined for the first server and contains data associated with the first server, the second server, the client, and a digital signature; request secure communication access to the first server, wherein the request includes transferring the client token to the first server; and receive a grant of secure communication access to the first server based on authentication of the client by the first server, wherein the authentication is based on the client token validating the client and the digital signature validating the client token.

According to another embodiment, one or more computer-readable media store computer-executable instructions for obtaining a secure connection between a first server and a client that, when executed, may cause one or more computing devices included in the client to: establish a secure communication session between a second server and the client, wherein the second server is trusted by the first server, and the second server is configured to authenticate the client; receive a client token using the secure communication session, wherein the client token is defined for the first server and contains data associated with the first server, the second server, the client, and a digital signature; request secure communication access to the first server, wherein the request includes transferring the client token to the first server; and receive a grant of secure communication access to the first server based on authentication of the client by the first server, wherein the authentication is based on the client token validating the client and the digital signature validating the client token.

According to another embodiment, an apparatus for obtaining a secure connection between a first server and a client. The apparatus may comprise: a means for establishing a secure communication session between a second server and the client, wherein the second server is trusted by the first server, and the second server is configured to authenticate the client; a means for receiving, by the client, a client token using the secure communication session, wherein the client token is defined for the first server and contains data associated with the first server, the second server, the client, and a digital signature; a means for requesting, by the client, secure communication access to the first server, wherein the request includes transferring the client token to the first server; and a means for receiving, by the client, a grant of secure communication access to the first server based on authentication of the client by the first server, wherein the authentication is based on the client token validating the client and the digital signature validating the client token.

According to another embodiment, a method may comprise receiving authentication information at a client from an H-SLP, where authentication information is defined for the client and a D-SLP. The method may further comprise providing the authentication information from the client to the D-SLP when accessing or attempting to access the D-SLP. In some embodiments, secure access to the D-SLP may be granted to the client based on the authentication information. The authentication information may comprise a digital signature, for example.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

FIG. 6A illustrates the content of a SET Token, according to one embodiment.

FIG. 6B illustrates the content of a SLP Certificate, according to one embodiment.

DETAILED DESCRIPTION

Figure 1A:
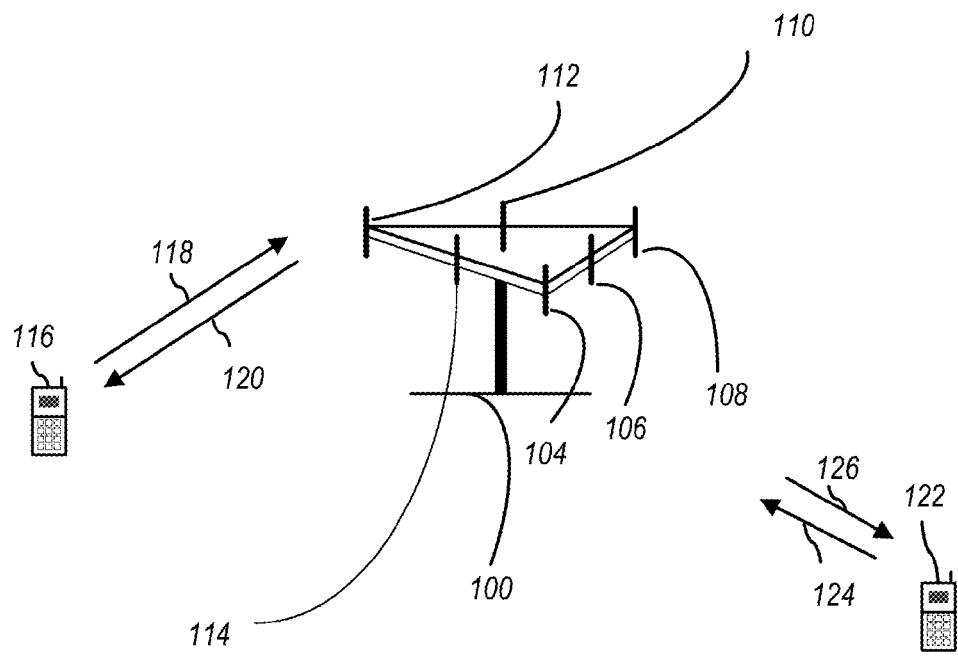
FIG. 1A is a graphical illustration of an example wireless network environment that can be employed in conjunction with the various systems and methods described herein.

Apparatuses, methods, systems and computer-readable media for authenticating a secure connection between a SUPL Enabled Terminal (SET) and a SUPL location platform (SLP) are presented. Sometimes a secure connection can be established using conventional authentication methods (e.g., ACA based, GBA based). Embodiments of the present invention employ a client token method (e.g., SET Token method) to assist in carrying secure authentication data when other authentication methods are unavailable or fail.

This disclosure includes embodiments which use a client token for client authentication by the location server. Client authentication can rely on the ability of the location server to verify the identity and the authenticity of the identity of the client, which the client provides to the location server during server access.

The techniques described herein may be used for mobile device or client access to various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), CDMA2000, etc. UTRA includes Wideband-CDMA (W-CDMA) and Low Chip Rate (LCR). CDMA2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA is part of Universal Mobile Telecommunication System (UMTS). Long Term Evolution (LTE) is a radio access technology used by E-UTRA. UTRA, E-UTRA, GSM, UMTS and LTE are described in documents from an organization named "3rd Generation Partnership Project" (3GPP). CDMA2000 is described in documents from an organization named "3rd Generation Partnership Project 2" (3GPP2). These various radio technologies and standards are known in the art.

Single carrier frequency division multiple access (SC-FDMA), which utilizes single carrier modulation and frequency domain equalization, is a technique. SC-FDMA may have similar performance and overall complexity as those of OFDMA system. An SC-FDMA signal may have lower peak-to-average power ratio (PAPR) because of its inherent single carrier structure. SC-FDMA has drawn great attention, especially in the uplink communications where lower PAPR greatly benefits the mobile terminal in terms of transmit power efficiency. It is currently a working assumption for the uplink multiple access scheme in 3GPP Long Term Evolution (LTE), or Evolved UTRA.

Various embodiments are described herein in connection with a mobile device, an access terminal or SET. A mobile device, access terminal or SET can also be called a system, subscriber unit, subscriber station, mobile station, mobile, remote station, remote terminal, mobile device, user terminal, terminal, mobile terminal, wireless device, wireless terminal, wireless communication device, user agent, user device, or user equipment (UE). A mobile device, access terminal or SET can be a cellular telephone, a cordless telephone, a Session Initiation Protocol (SIP) phone, a wireless local loop (WLL) station, a personal digital assistant (PDA), a handheld device having wireless connection capability, a computing device, a laptop, a tablet or other processing device connected to or containing a modem, for example a wireless modem. Moreover, various embodiments are described herein in connection with a base station. A base station can be utilized for communicating with access terminal(s) and can also be referred to as an access point, Node B, Evolved Node B (eNodeB), access point base station, a WiFi access point, a Femtocell, home base station, home Node B, home eNodeB or some other terminology.

Referring to FIG. 1A, a multiple access wireless communication system according to some embodiments is illustrated. An access point (AP) 100 includes multiple antenna groups, one including 104 and 106, another including 108 and 110, and an additional including 112 and 114. In FIG. 1, only two antennas are shown for each antenna group, however, more or fewer antennas may be utilized for each antenna group. An access terminal, such as a SET 116, is in communication with antennas 112 and 114, where antennas 112 and 114 transmit information to the access terminal (e.g., SET 116) over forward link 120 and receive information from access terminal (e.g., SET 116) over reverse link 118. Another access terminal (e.g., SET 122) is in communication with antennas 106 and 108, where antennas 106 and 108 transmit information to access terminal (e.g., SET 122) over forward link 126 and receive information from access terminal (e.g., SET 122) over reverse link 124. In a Frequency Division Duplex (FDD) system, communication links 118, 120, 124 and 126 may use a different frequency for communication. For example, forward link 120 may use a different frequency than that used by reverse link 118.

The system in FIG. 1A may support operation on multiple carriers (waveform signals of different frequencies). Multi-carrier transmitters can transmit modulated signals simultaneously on the multiple carriers. Each modulated signal may be a Code Division Multiple Access (CDMA) signal, a Time Division Multiple Access (TDMA) signal, an Orthogonal Frequency Division Multiple Access (OFDMA) signal, a Single-Carrier Frequency Division Multiple Access (SC-FDMA) signal, etc. Each modulated signal may be sent on a different carrier and may carry pilot data, overhead information, data, etc.

Each group of antennas and/or the area in which they are designed to communicate may be referred to as a sector of the access point. In the embodiment, antenna groups each are designed to communicate to access terminals in a sector of the areas covered by access point 100.

In communication over forward links 120 and 126, the transmitting antennas of access point 100 may utilize beamforming in order to improve the signal-to-noise ratio of forward links for the different access terminals. Also, an access point using beamforming to transmit to access terminals scattered randomly through its coverage may cause less interference to access terminals in neighboring cells than an access point transmitting through a single antenna to all its access terminals. In some embodiments, beamforming is not performed Other access points or transmitting stations may be employed. For example, a base station may be used in addition to or instead of the AP 100. In some embodiments, a first transmitter such as the AP 100 may provide access to a first network while a second transmitter, for example a cellular base station, may provide access to a second network. In some embodiments, the areas in which each of the first transmitter and second transmitter may be accessed overlap.

Figure 1B:
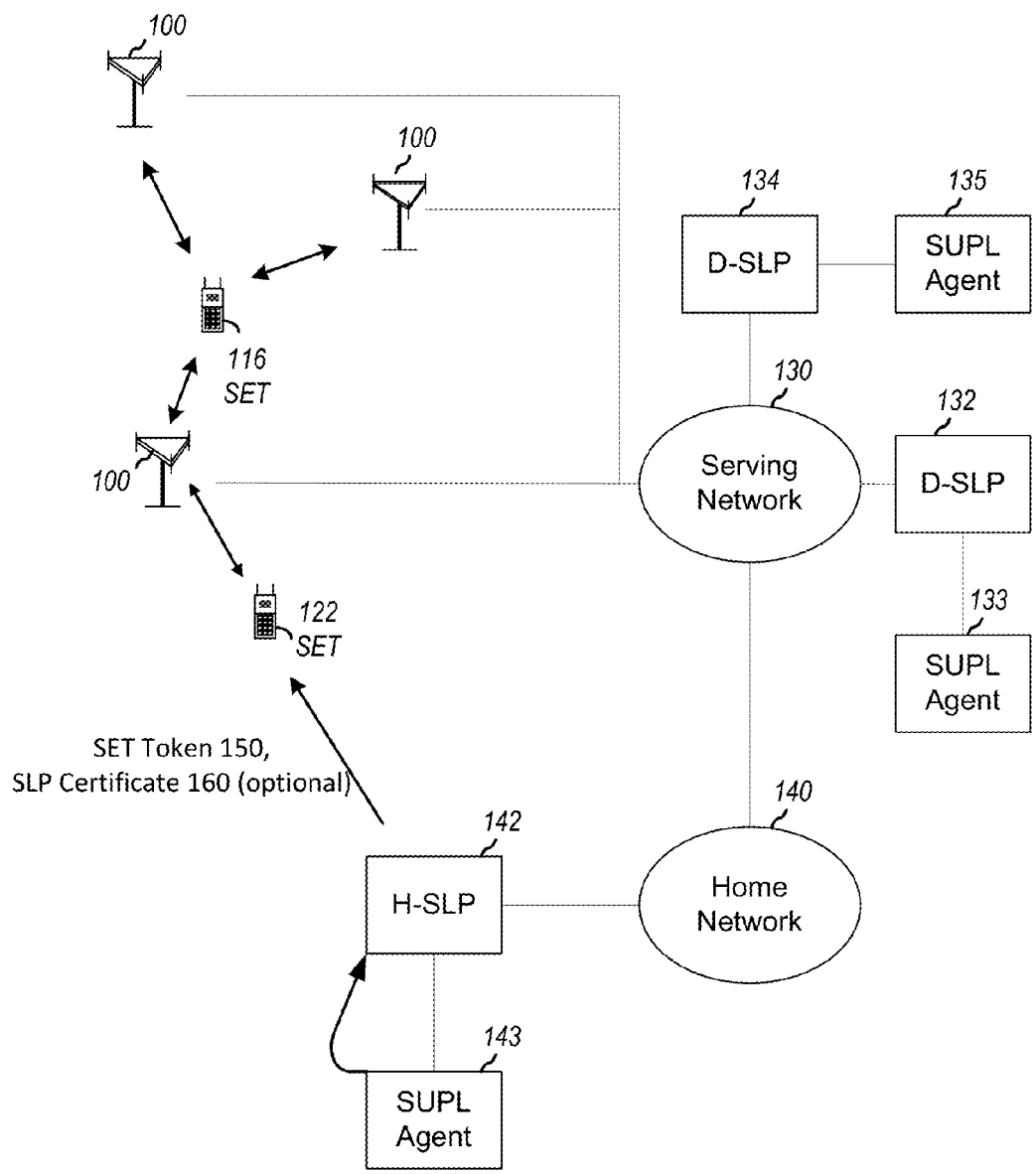
FIG. 1B illustrates one or more SET accessing one or more base stations and access points.

FIG. 1B illustrates one or more SETs accessing one or more base stations and access points. For example a SET 116 can access some APs and base stations. The base stations and access points can be connected to a serving network 130 (e.g. a WCDMA, LTE or cdma2000 serving network). Additionally, the serving network 130 can be connected to a home network 140 either directly or via intermediate entities and systems such as the Internet. In some cases, serving network 130 and home network 140 may be the same network. In this example D-SLP 132 and D-SLP 134 can be connected to or can be part of the serving network 130. Additionally, a H-SLP 142 can be connected to or can be part of the home network 140.

According to some embodiments, a SUPL Agent 133, 135, 143, also known as an External Client, can be connected to each SLP 132, 134, 142, respectively. For example, a SUPL Agent 143 can request the location of a SET 122 from its associated SLP (i.e., H-SLP 142), and the SLP (i.e., H-SLP 142) can then instigate a SUPL session with the SET 122 to obtain the location. Furthermore, in the SET Token method example, a SET Token 150 and an SLP certificate 160 can be carried in a SUPL message from H-SLP 142 to a SET such as SET 122, as further illustrated in FIGS. 4A-C.

In FIG. 1B, H-SLP 142 may be the home SLP for SET 116 and SET 122. SETs 116 and 122 may then obtain location services from H-SLP 142 in some situations—e.g. when SETs 116 and 122 are each directly accessing home network 140. Such location services may be supported using the SUPL location solution defined by OMA and may include the transfer of assistance data from H-SLP 140 to SET 116 or SET 122 to enable either SET to acquire and measured radio signals from access points and base stations (such as access points 100) in the current serving network and/or from global navigation satellites (not shown in FIG. 1B) such as satellites belonging to the Global Positioning System GPS) or other systems such as the European Galileo system or Russian GLONASS system. Additional SUPL location services performed by H-SLP may include computation of a location estimate for SET 116 or 122 based on signal measurements made and provided to H-SLP 142 by SET 116 or 122. Further SUPL location services may include transfer of a location estimate obtained by H-SLP 142 to SUPL Agent 143 or to SET 116 or SET 122. In the case that SET 116 and SET 122 are accessing serving network 130 which is different to home network 140, better location services may be provided using SUPL by D-SLP 132 and D-SLP 134 than by H-SLP 142. This may arise because D-SLPs 132 and 134 have better knowledge of serving network 130 than does H-SLP 142 (e.g. better knowledge of the locations and transmission characteristics of access points 100) and thus may be better able to (i) provide location assistance data related to acquiring and measuring radio signals from serving network 130, (ii) compute an accurate location using such measurements and/or (iii) provide assistance data to SETs 116 and 122 enabling these SETs to compute such a location by themselves. For this reason, it may be advantageous for H-SLP 142 to provide SETs 116 and 122 with information needed to access D-SLPs 132 and 134 in a secure manner. Such information may include the addresses (e.g. IP addresses or fully qualified domain names (FQDNs)) for D-SLPs 132 and 134 and an authorization to access these D-SLPs under certain conditions (e.g. at certain locations, at certain times and/or while accessing certain networks such as serving network 130).

Figure 2:
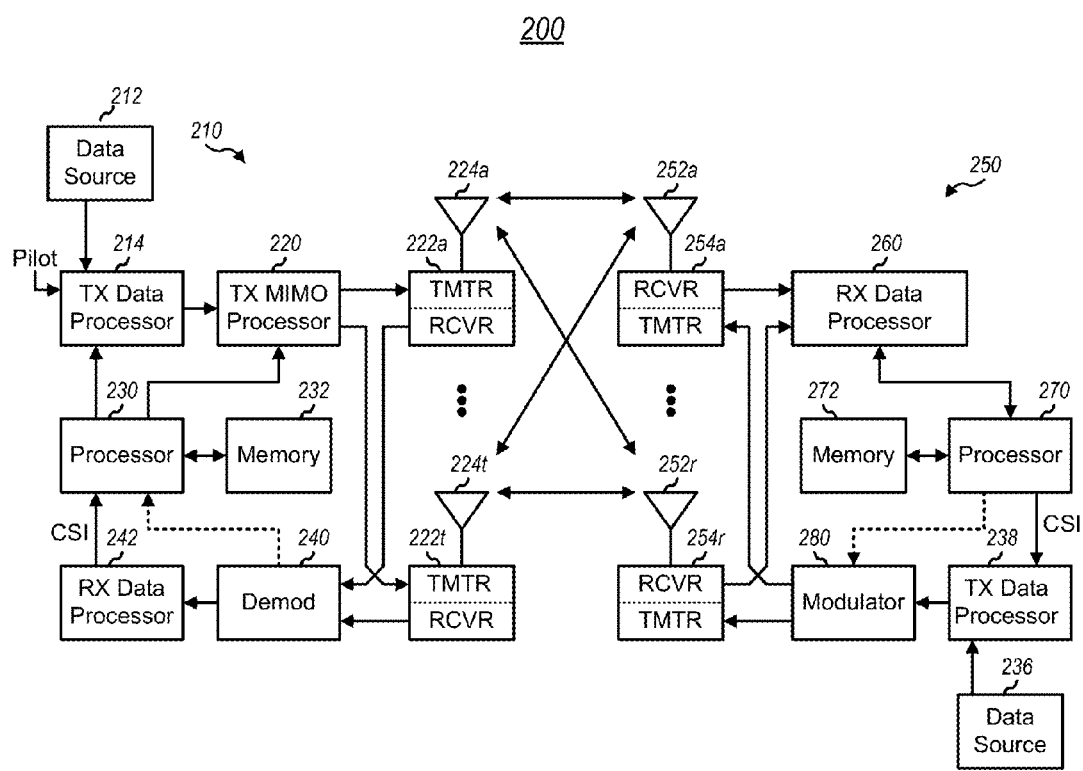
FIG. 2 is an exemplary apparatus of various embodiments.

FIG. 2 is a block diagram of an embodiment of a transmitter system 210 (which may, for example, implement the access point 100) and a receiver system 250 (which may, for example, implement an access terminal such as the SET 116) in a MIMO system 200. It should be noted however, that while an example MIMO system 200 is described, MIMO is not used in some embodiments, as other systems may be used (e.g. SISO, MISO, SIMO, etc.). At the transmitter system 210, traffic data for a number of data streams is provided from a data source 212 to a transmit (TX) data processor 214.

In some embodiments, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream are then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 230. The instructions can be stored in memory 232.

The modulation symbols for all data streams are then provided to a TX MIMO processor 220, which may further process the modulation symbols (e.g., for OFDM). TX MIMO processor 220 then provides NT modulation symbol streams to NT transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. NT modulated signals from transmitters 222a through 222t are then transmitted from NT antennas 224a through 224t, respectively.

At receiver system 250, the transmitted modulated signals are received by NR antennas 252a through 252r and the received signal from each antenna 252 is provided to a respective receiver (RCVR) 254a through 254r. Each receiver 254 conditions (e.g., filters, amplifies, and down-converts) a respective received signal, digitizes the conditioned signal to provide samples, and further processes the samples to provide a corresponding "received" symbol stream.

An RX data processor 260 then receives and processes the NR received symbol streams from NR receivers 254 based on a particular receiver processing technique to provide NT "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix, which can be stored in memory 272, to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210. Two or more receiver, transmitter, and antenna groups may be configured to access separate networks, for example a WLAN network and an LTE, WCDMA, or cdma2000 HPRD network. In some embodiments, a single receiver, transmitter, and antenna group may be configured to access at least two separate networks. Similarly, a plurality of processors may be included to process communications and/or data for a plurality of networks. Further, a single processor may be configured to process communications and/or data for a plurality of networks.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights and then processes the extracted message.

SUPL-Enabled Communication System

A home location server (e.g. a Home SLP (H-SLP) in the case of SUPL) is a location server affiliated with a client mobile device such as a SET (e.g., based on service subscription). In the following description, the term client refers to a mobile device such as a SET that is a client of the home location server and may obtain location services via interaction with the home location server using, for example, SUPL. A home location server and a client may have been provisioned with the identity of each other (e.g. addresses). For example, the client may use the pre-provisioned identity of the home location server (e.g., FQDN or IP address) to gain access to the server and then authenticate the server based on the server's public key certificate using conventional public key mechanisms. Additionally, the home location server may identify the client by the identity of the client, which the client can provide to the home location server during server access, and by additional information provided to the home location server that verifies the authenticity of the identity of the client. This additional information may be provided by the underlying access network or home network of the client which is able to identify the client (e.g. able to determine the client's identity such as its International Mobile Subscriber Identity (IMSI)) based on the client's assigned access network address such as the IP address of the client. In SUPL, the discovery of this binding of client identity to client access network address by an H-SLP forms the basis of the Alternative Client Authentication (ACA) method of authenticating a SET by an H-SLP. A client and its home location server may also use other methods for authentication of the client by the home location server (e.g., GBA or device certificates). Both of these methods depend on knowledge of a secret PSK by both the device and the server (or any network associated with the server) and cannot be used (e.g. by a server) when the PSK is unknown.

ACA depends on an ability, either by the server or by a network associated with the server, to associate a public IP address of a wireless device with a global identity (e.g. international telephone number) of the wireless device. ACA cannot be used by a server when the server or its associated network cannot perform this IP address association or when the global identity of the wireless device is not already known to the server. The server certificate and device certificate based methods depend on one party (either the server or wireless terminal) providing a digitally signed global self identification (e.g. an international wireless terminal ID or a global server Internet address) to the other party which the latter can verify using a known public key or known root public key to verify the digital signature and pre-provisioned knowledge. The digitally signed and now verified global identification can then be compared to any global identification already known and if a match is found, the global identification may be trusted. These certificate based methods cannot be used (e.g. by server) when the public key or root public key or the global identification are not already known.

In the case of a discovered location server, because the association with any wireless terminal will always be temporary, knowledge of a PSK or any wireless device global identity will sometimes be lacking rendering the PSK and device certificates based authentication methods unable to authenticate the wireless device. In addition, the discovered location server may not be able to verify an IP address association for the wireless device with a wireless device global identity or may not be pre-provisioned with a valid wireless device global identity rendering the ACA method unable to authenticate the wireless device. In some cases, a wireless device or its home network may not support device certificates or GBA, making these methods unavailable to the discovered location server even when they might otherwise have been used. In these cases, a discovered location server may need to make use of some other non-conventional method to authenticate a wireless device.

A location server without a pre-provisioned affiliation with a client (i.e., a non-home location server vis-à-vis the client) can be utilized to provide location services to the client. This can occur if both entities (i.e., client and non-home location server) are able to mutually authenticate each other and if the home location server of the client has authorized this server for use by the client. In this disclosure such a location server is called a discovered location server.

In the case of SUPL, a discovered location server is referred to as a Discovered SLP (D-SLP). As described herein earlier, a discovered location server (e.g. D-SLP) may, in some circumstances, provide better location services to a client than a home location server (e.g. H-SLP)

To authorize a discovered location server for use by the client, the home location server may either provide or confirm to the client the identity of the discovered location server (e.g., its FQDN). Additionally, the home location server may provide access related information (e.g., authorized service duration, billing code). This process is called discovered location server authorization. The process may be instigated by the client who may send a request to the home location server to either authorize a particular discovered location server or provide the client with the identity of a discovered server if the client was unable to discover such a server itself. After discovered location server authorization, the client will be able to access the discovered location server and authenticate the discovered location server based on a public key mechanism using the public key of the server (which may be in turn authenticated using a chain of certificates originating with a certificate based on a known root public key), similar to the client authenticating its home location server. Such a public key mechanism is used by SUPL.

In some instances, the discovered location server may be unable to authenticate the client because the identity of the client provided by the client during access to the discovered location server cannot be verified by the discovered location server due to lack of information required to confirm the authenticity of the identity of the client. As previously mentioned, while an H-SLP may be able to authenticate a SET using the ACA, GBA or device certificates methods, a D-SLP may not be able to use the conventional authentication methods to authenticate a SET.

Client Token Method

In the client token method, as part of the discovered location server authorization process, the home location server provides digitally signed client related information to the client via the client token.

The client token may also be referred to as a client certificate, a client certified data, or a SET Token. The client token may comprise one or more of the client identity (e.g., IMSI, Mobile Station Integrated Services Digital Network Number (MSISDN), client public user address), the home location server identity or address, the discovered location server identity or address and the time and duration of discovered location server authorization. This information is digitally signed by the home location server using a secret private key. The digital signature can be verified by any other entity (e.g. the discovered location server) using either the known public key corresponding to the private key used by the home location server or a digital certificate provided by the home location server that enables this public key to be obtained by secure means. For example, the home location server can provide its own digital certificate to the client (e.g., public key certificate, Server Certificate, SLP certificate 160). The digital certificate can comprise the identity of the home location server and the public key used by the home location server to digitally sign the client token. Additionally, this information may be digitally signed by another entity which may be a Certificate Authority (CA). The CA may be known to and trusted by any entity (e.g. a discovered location server) that needs to verify the client token and the public key used by the CA to digitally sign the home location server public key may also be known. If not known and trusted, the home location server may provide an additional chain of certificates originating from some known and trusted root CA as part of the digital certificate that certify the digital signature of the CA. The client receives both the client token and, if sent, the digital certificate from the home location server. The client may store both the client token and digital certificate in a secure manner such that the information cannot easily be obtained by another entity. For example, the information may be stored in encrypted form by the client (using a key kept in secure client memory) and/or may be stored in secure memory that cannot be accessed by the user or other entities external to the client. Furthermore, the client token and digital certificate may be sent by the home location server to the client over a secure link (i.e., after home location server and client performed successful mutual authentication and using encryption set up during this authentication).

After the discovered location server authorization process, the discovered location server session establishment process may commence. In the session establishment process, the client may access the discovered location server for the first time. As part of this first time access, the client may be able to authenticate the discovered location server via a public key certificate sent to the client by the discovered location server. However, the discovered location server may not be able to initially authenticate the client (e.g., if the ACA or GBA method cannot be used). Instead, the discovered location server may temporarily accept the access from the client. The client may then send both the client token and digital certificate to the discovered location server as part of the first location related message (e.g. for SUPL, the first SUPL message) sent to the discovered location server. The discovered location server may use the client token to verify the authenticity of the client's identity and, if provided, may use the digital certificate to verify the authenticity of the digital signature of the home location server for the client token. Additionally, the discovered location server may store the digital certificate, so that the client does not need to re-send the digital certificate during subsequent server access. Therefore, during future discovered location server access, the client may only provide the client token in some embodiments.

Authentication

Authentication of the client by the discovered location server can utilize the digitally signed information in the client token. As previously mentioned, the client token (e.g., SET Token) may comprise the client (e.g., SET) identity, the home location server (e.g., H-SLP) identity, the discovered location server (e.g., (D-SLP) identity, the time the token was issued and its duration. The discovered location server can trust this information either because it already knows the public key associated with the home location server digital signature applied to the client token, or because this public key is authenticated by the digital certificate. Assuming the discovered location server trusts the home location server (e.g. via a previous commercial arrangement between the providers of these servers), it can know that a client with the provided (and now authenticated) identity has been authorized to access it (via the inclusion of the now authenticated discovered location server identity) by the home location server (whose identity is also included and authenticated). If the client token further includes a date and time range, the discovered location server can also know for what period the client was authorized to access it. Knowledge of such a period may be useful to prevent reuse of the same client token by either the same client or some other device that may have somehow intercepted or obtained it to obtain unauthorized location services from the discovered location server after this period has expired (or in some cases before it has commenced).

While the information is authenticated as described above, the discovered location server cannot verify that it was the client that sent this information and not another entity that may have intercepted or otherwise illicitly obtained the information. To prevent such illicit use by another entity, the client token and digital certificate may be transferred to the client by the home location server over a secure (e.g. ciphered) connection. Additionally, the client may keep the information in secure memory and/or in ciphered form, as described herein earlier, and not allow access to the information by the user or any other entity except for the intended discovered location server. The client token may also include the identity of the discovered location server to prevent use of the client token, by the client or another entity, with any other location server.

The client token and the digital certificate may remain valid until they either expire or are revoked by the home location server. According to some embodiments, the client token and digital certificate can carry an expiration date. Additionally, the home location server may revoke a client token by providing a new client token during another discovered location server authorization. The new client token can replace the previously stored client token on the client. If no new client token is provided during discovered location server authorization, any existing client token on the client can be erased.

The same mechanism may apply to the digital certificate for the home location server. Additionally, whenever a digital certificate is provided by the home location server to the client during discovered location server authorization, the client can send the digital certificate to the discovered location server during initial discovered location server access. Then, the discovered location server may replace any existing (e.g., previously stored) digital certificate with the new certificate and store it for future use. The client may not then need to provide the digital certificate for subsequent access to the discovered location server after the first access because the discovered location server already has the digital certificate from the first access. However, the client may provide the client token for each subsequent access to the discovered location server to enable the discovered location server to authenticate the client.

In some embodiments, the digital certificate may be provided to the discovered location server by the home location server by means of a separate secure communication session between the two servers and not require transfer to the client by the home location server and transfer by the client to the discovered location server.

Additionally, the home location server may use the digitally signed client token to securely convey additional information related to the authorized service to the discovered location server. This information may include billing related information (e.g., a billing code that has been uniquely assigned to the client by the home location server), service related information (e.g., an authorized geographical service area, a list of authorized services that the discovered location server may provide to the client) and/or any other information that the discovered location server may need to provide service to the client. The discovered location server may use this information when authorizing a service request by the client or when communicating billing information to the home location server or network associated with the home location server.

The discovered location server authorization process can require that the home location server and client communicate over a secure link after successful mutual authentication in some embodiments. This may require (e.g. if GBA or device certificate authentication are not supported) an access network to be able to provide information needed by the home location server to verify the authenticity of the identity of the client (e.g., access network address of client and identification of client as used by the ACA method of authentication).

In the instance when a client uses a first access network which does not provide this functionality (e.g., a public or private WiFi network), discovered location server authorization by the home location server may not be able to take place because the home location server is unable to authenticate the client (e.g. using the ACA method). The client may, however, resolve this situation by temporarily switching to a second access network which does provide this functionality (e.g., the client's home network or a network that conforms to standards compatible to those supported by the home network such as 3GPP or 3GPP2 standards). Discovered location server authorization by the home location server can then take place using this second access network. After successful discovered location server authorization by the home location server, the client may switch back to the first access network and obtain service from the discovered location server using the first access network. The client token method can also enable authenticated client access to a home location server (e.g. H-SLP) when authentication of the client by the home location server may not otherwise be possible. When a client obtains access to its home location server and can be authenticated by the home location server using some other mechanism (e.g. GBA, ACA, device certificates), the home location server may provide a client token to the client. At some subsequent time, the client may access the home location server in an environment (e.g. using another access network such as a WiFi network) where the home location server is unable to authenticate the client using other methods. In this case, the client may send the client token previously obtained from the home location server to the home location server to enable the home location server to authenticate the client. In this case, the discovered location server identity or address normally included in the client token may be replaced with the home location server identity or address when the home location server originally provides the client with the client token. A digital certificate may not be needed in this case because the home location server will already know and trust its own public key.

SET Token Method

The SET Token method is an example of the client token method that is specific for SUPL, but the concepts described herein may be extended to other communication paradigms. The D-SLP concept currently defined by OMA in SUPL 2.1 uses SUPL 2.0 security mechanisms which require use of ACA and/or GBA for mutual authentication. For example, GBA may not be applicable since there are few to no commercial deployments. Additionally, use of ACA requires that IP address spoofing is not possible when accessing the D-SLP and that it be possible to reliably associate the SET IP address and SET global identity (e.g. IMSI or MSISDN) by the D-SLP or D-SLP associated SET serving network which may not always be possible (e.g. for SET access to a D-SLP via a WLAN).

By introducing a new parameter called a SET Token 150, which the H-SLP 142 sends to the SET 116 as part of the D-SLP authorization, D-SLP authorization of SET 116 becomes possible. The SET 116 can include SET Token 150 in any initial SUPL message sent to the D-SLP during SUPL session establishment. SET Token 150 can contain SET, H-SLP and D-SLP related information digitally signed by the H-SLP.

The SET Token method provides authentication when the D-SLP 132 is unable to authenticate the SET 116 using other authentication methods. The SET Token method can enable authentication of SET 116 by D-SLP 132 in scenarios where neither GBA nor ACA are available or applicable. Scenarios where this may be needed include those where GBA is not deployed or where ACA is not applicable. For example, this may occur if the access network used for D-SLP access does not meet ACA requirements, such as supporting a spoofing free network environment and/or enabling the binding of SET IP address to SET identity to be verified.

The SET Token method can require in some embodiments that the D-SLP authorization process occurs over a secure Transport Layer Security (TLS) connection between the SET and its H-SLP where SET authentication is performed by the H-SLP using GBA, device certificates or ACA (and where SET authentication of the H-SLP may be performed using public key server certificates provided to the SET by the H-SLP). In the D-SLP authorization process, the H-SLP 142 can send a SET Token 150 and, optionally, its own digital certificate (SLP Certificate 160) to the SET 116. When H-SLP 142 authorizes more than one D-SLPs for access by SET 116, H-SLP 142 may provide a separate SET Token 150 for each D-SLP that is authorized since each SET Token may contain the individual D-SLP address or identity and thus may not be the same as the SET Token for some other D-SLP. However, H-SLP 142 may provide one common digital certificate (i.e. one common SLP Certificate 160) for all of the SET Tokens 150 because the digital certificate may only contain information specific to H-SLP 142 and not to any D-SLP. When the SET 116 subsequently accesses an authorized D-SLP 132, the SET 116 may authenticate the D-SLP 132 using public key authentication (e.g., the same way the SET authenticates an H-SLP or D-SLP for the ACA method). After successful D-SLP authentication and establishment of a secure (e.g. ciphered) IP connection between SET 116 and D-SLP 132, the SET 116 may send to D-SLP 132 the SET Token 150 associated with the D-SLP 132 and the SLP Certificate 160, if provided by the H-SLP 142. This may occur during initial access by SET 116 to D-SLP 132 (e.g., may be transferred by SET 116 to D-SLP 132 in a SUPL START, SUPL TRIGGERED START or SUPL POS INIT message depending on the type of SUPL session being used). The D-SLP 132 may then use the SET Token 150 to authenticate the SET 116 and the SLP Certificate 160 to validate the authenticity of the SET Token 150. According to one embodiment, a D-SLP may know the public key for the H-SLP (e.g. via an offline process) in which case an SLP certificate need not be provided or need not be used if provided.

Authentication of the SET Token 150 by the D-SLP is enabled by providing the D-SLP with the digital certificate (e.g., public key certificate) of the H-SLP. To this end the H-SLP 142 sends its public key certificate to the SET (e.g., SLP Certificate 160) during D-SLP authorization which the SET 116 then also sends to the D-SLP 132 during session establishment.

Additionally, the SET Token 150 may also include non-security related information such as for example a billing code. By way of SET Token 150, H-SLP and D-SLP can securely exchange information required for authentication, authorization, billing and other purposes.

Figure 3:
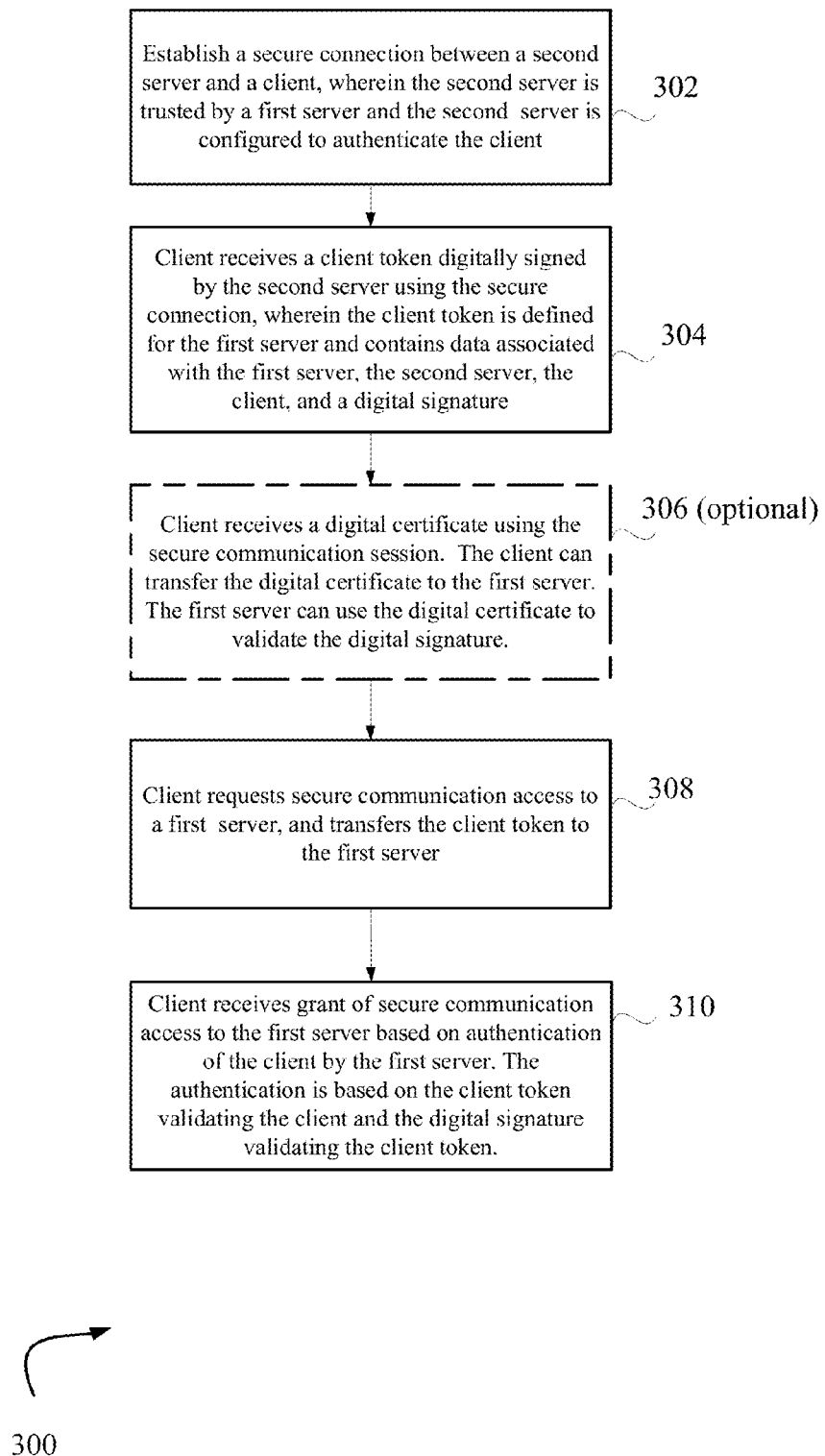
FIG. 3 is an exemplary flowchart describing various embodiments.

FIG. 3 illustrates an exemplary method 300 for obtaining a secure connection between a first server and a client. In some embodiments, the first server may be a D-SLP such as D-SLP 132 or 134 in FIG. 1B and the client may be a SET such as SET 116 or 122 in FIG. 1B.

At 302, a client and a second server can establish a secure connection. The second server is trusted by the first server, and the second server is able to authenticate the client. In some embodiments, the client is implemented by the system 250. In such embodiments, at least portions of 302 may be performed, for example, by the transceiver 252—e.g., in combination with the modulator 280—and/or one or more of the processors 238, 260, and 270—e.g., in combination with information and/or instructions from the data source 236 and/or memory 272. In some embodiments, the second server is implemented by the system 210. In such embodiments, at least portions of 302 may be performed, for example, by the transceiver 222—e.g., in combination with the demodulator 240—and/or one or more of the processors 214, 220, 230, and 242—e.g., in combination with information and/or instructions from the data source 212 and/or memory 232.

For example, at 302, a client (e.g., SET 116) can establish a secure connection with a second server such as a home location server for the client (e.g., H-SLP 142). In this example, the SET 116 can access its H-SLP 142 using a public cellular network such as an LTE, WCDMA, GSM or cdma2000 HRPD network. The access may be invoked by the H-SLP 142 or by the SET 116.

According to some embodiments, to establish a secure connection at 302, the SET can authenticate the H-SLP using a public key certificate provided by the H-SLP to the SET (at initial SET access) and the H-SLP can authenticate the SET by reliably obtaining from the access network the SET identity (e.g. IMSI or MSISDN) associated with the IP address the SET is using to access the H-SLP. This authentication method constitutes the ACA authentication method, but other authentication methods can also be used such as GBA or device certificates.

At 304, the client receives a client token from the second server using the secure communication session. The client token is specifically defined for the first server and contains data associated with the first server, the second server, the client and a digital signature. Block 304 may be triggered if the client requests authorization from the second server to access the first server or if the second server perceives a benefit to the client in being able to access the first server (e.g. at the client's current location or using the client's current access network) or if the client requests authentication information from the second server to access the first server or for other reasons. In some embodiments, the client is implemented by the system 250. In such embodiments, at least portions of 304 may be performed, for example, by the transceiver 252—e.g., in combination with the modulator 280—and/or one or more of the processors 238, 260, and 270—e.g., in combination with information and/or instructions from the data source 236 and/or memory 272. In some embodiments, the second server is implemented by the system 210. In such embodiments, at least portions of 304 may be performed, for example, by the transceiver 222—e.g., in combination with the demodulator 240—and/or one or more of the processors 214, 220, 230, and 242—e.g., in combination with information and/or instructions from the data source 212 and/or memory 232.

For example, at 304, a SUPL session can be established between the H-SLP 142 and SET 116 and, either as part of this session or using another SUPL session, the H-SLP 142 transfers to the SET 116 a SET Token 150, which can include the SET identity, H-SLP identity, the current time and validity period of the token. The SET Token 150 is digitally signed by the H-SLP 142. The transfer may be unsolicited, as illustrated in FIG. 4C, or may be requested by the SET, as illustrated in FIG. 4B.

According to another embodiment, at 304, the SET 116 can receive a SET Token 150 from the H-SLP 142. The SET Token 150 can be specifically defined for the D-SLP 132 and contains data associated with the D-SLP 132, the H-SLP 142, the SET 116 and a digital signature.

Optionally, at 306, the client (e.g., SET 116) can receive a digital certificate (e.g., SLP certificate 160) using the secure communication session. The client (e.g., SET 116) can transfer the digital certificate (e.g., SLP certificate 160) to the first server (e.g., D-SLP 132) in the request of 308. The first server (e.g., D-SLP 132) can use the digital certificate (e.g., SLP certificate 160) to validate the digital signature. In some embodiments, the client is implemented by the system 250. In such embodiments, at least portions of 306 may be performed, for example, by the transceiver 252—e.g., in combination with the modulator 280—and/or one or more of the processors 238, 260, and 270—e.g., in combination with information and/or instructions from the data source 236 and/or memory 272. In some embodiments, the second server is implemented by the system 210. In such embodiments, at least portions of 306 may be performed, for example, by the transceiver 222—e.g., in combination with the demodulator 240—and/or one or more of the processors 214, 220, 230, and 242—e.g., in combination with information and/or instructions from the data source 212 and/or memory 232. According to some embodiments, 308 occurs because other authentications methods (e.g., ACA, GBA) between the client and the first server fail. To illustrate, as part of 308, a SET attempts to access the D-SLP using a Wireless Local Area Network (WLAN). As part of this access, the SET IP address is transferred to the D-SLP. The SET attempts to authenticate the D-SLP using a public key certificate for the D-SLP and may succeed in this authentication. However, the D-SLP cannot authenticate the SET using ACA because the D-SLP is either unable to reliably obtain the SET identity corresponding to the SET IP address from the WLAN or the D-SLP is able to obtain the SET identity but is not able to match the identity to any identity previously provisioned in the D-SLP, for example. ACA authentication thus fails from the perspective of the D-SLP. However, the D-SLP may still allow the establishment of a secure connection with the SET to succeed in anticipation of the next part of 308 in which, after establishing the secure connection to the D-SLP, the SET transfers the SET token 150 received earlier from the H-SLP to the D-SLP. The D-SLP may then authenticate the SET using the SET token and any SLP certificate 160 also received as part of 308 from the SET.

In some embodiments, the client is implemented by the system 250. In such embodiments, at least portions of 308 may be performed, for example, by the transceiver 252—e.g., in combination with the modulator 280—and/or one or more of the processors 238, 260, and 270—e.g., in combination with information and/or instructions from the data source 236 and/or memory 272. In some embodiments, the first server is implemented by the system 210. In such embodiments, at least portions of 308 may be performed, for example, by the transceiver 222—e.g., in combination with the demodulator 240—and/or one or more of the processors 214, 220, 230, and 242—e.g., in combination with information and/or instructions from the data source 212 and/or memory 232.

To further illustrate 308, according to another embodiment in which the first server and second server are both the same H-SLP and 302, 304 and 306 occur some time before 308 at a time when the H-SLP can authenticate the SET using ACA or some other conventional method, the H-SLP can temporarily allow SET access to proceed at 308 and a SUPL session is established between the SET and H-SLP even though the H-SLP is unable to use ACA (or some other conventional method) to authenticate the SET. In this embodiment, the SET 116 transfers the SET Token 150 received earlier at 304 to the H-SLP. Then, the H-SLP uses the SET Token 150 to authenticate the SET identity. The transfer of the SET Token 150 may be unsolicited or may be requested by the H-SLP. The SET 116 may then receive confirmation from the H-SLP that authentication was successful at 310. This SUPL session continues and later terminates enabling the SET 116 to receive location services from the H-SLP.

Returning to the previous embodiment where the first and second servers are different (e.g. the first server is a D-SLP and the second server is an H-SLP), at 310, the client receives grant of secure communication access to the first server based on authentication of the client by the first server. The authentication may include using the client token to validate the client and using the digital signature to validate the client token. In some embodiments, the client is implemented by the system 250. In such embodiments, at least portions of 310 may be performed, for example, by the transceiver 252—e.g., in combination with the modulator 280—and/or one or more of the processors 238, 260, and 270—e.g., in combination with information and/or instructions from the data source 236 and/or memory 272. In some embodiments, the first server is implemented by the system 210. In such embodiments, at least portions of 310 may be performed, for example, by the transceiver 222—e.g., in combination with the demodulator 240—and/or one or more of the processors 214, 220, 230, and 242—e.g., in combination with information and/or instructions from the data source 212 and/or memory 232.

For example, the SET 116 can receive grant of secure communication access to the D-SLP 132 based on the authentication of the SET 116 by the D-SLP. The authentication includes using the SET Token 150 to validate the SET and using the digital signature to validate the SET Token 150. Optionally, if 306 was included, the first server (e.g., D-SLP 132) can use the digital certificate (e.g., SLP certificate 160) to validate the digital signature.

According to another embodiment, the D-SLP (e.g. D-SLP 132) may access the SET 116 to obtain the SET location on behalf of an external client (e.g. SUPL Agent 133) using the IP address previously received. The SET 116 may transfer the SET token 150 previously received at 304 to the D-SLP (e.g. unsolicited or at the request of the D-SLP) to allow the D-SLP to authenticate the SET 116. The D-SLP may then reliably obtain the SET location and transfer the location to an external client.

H-SLP Authorization of One or More D-SLP (e.g., 302, 304, 306)

Figure 4A:
FIG. 4A illustrates a method of an H-SLP authorization of one or more D-SLP, according to one embodiment.
Figure 4B:
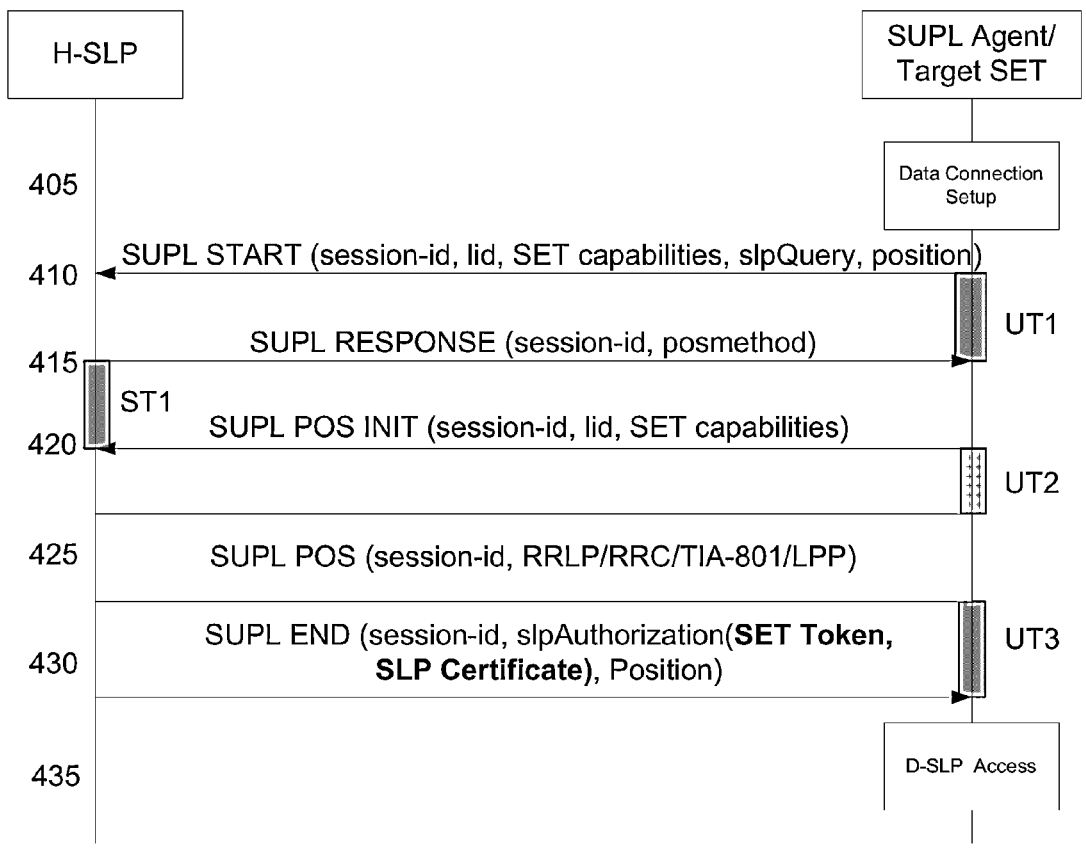
FIG. 4B illustrates a method of an H-SLP authorization of one or more D-SLP on request, according to one embodiment.
Figure 4C:
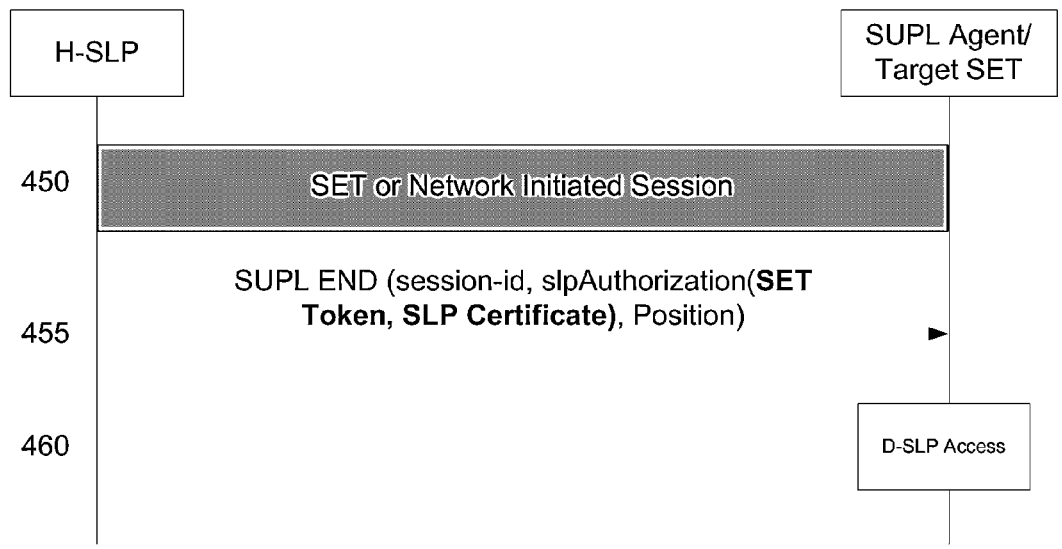
FIG. 4C illustrates a method of an unsolicited H-SLP authorization of one or more D-SLP, according to one embodiment.

Now referring to FIG. 4A, a SET may request authorization of one or more known D-SLPs and/or may request the addresses for one or more previously unknown but authorized D-SLPs by first establishing a secure connection to its H-SLP and then sending a SUPL START message to the H-SLP containing this request. The H-SLP may then return the requested D-SLP authorization and/or address information to the SET in a SUPL END message. As part of the information returned by the H-SLP in the SUPL END message for D-SLP authorization, the H-SLP may include the SET Token 150 which contains SET and H-SLP related information digitally signed by the H-SLP. The SET Token 150 may also contain non-security related information such as for example a billing code. The SET Token 150 may be part of the SUPL slpAuthorization parameter that contains other information related to D-SLP authorization (e.g. the addresses of authorized D-SLPs and the conditions under which the SET may access each of them). The H-SLP may also send its public key certificate (e.g., SLP certificate 160) to enable any D-SLP to verify the authenticity of the SET Token 150. The SLP certificate 160 sent by the H-SLP may not be D-SLP specific. Therefore the SLP certificate 160 may not need to be sent for each D-SLP separately, as is the case with SET Token 150, but may be applicable to all D-SLPs being authorized for this particular SET, thereby reducing signaling.

The SET Token is an example of an authorization parameter according to one embodiment of the present invention. According to other embodiments of the present invention, other parameters may be implemented as the client token or an authorization parameter.

H-SLP Authorization of One or More D-SLP (on Request)

FIG. 4B illustrates an exemplary procedure for H-SLP authorization of one or more D-SLPs on request and provision of the SET Token 150 for each D-SLP, and SLP certificate 160 for all D-SLPs (which are carried in the final SUPL END message). For example, this procedure can be invoked by a SET 116 to obtain authorization from the H-SLP 142 for D-SLPs (e.g., D-SLP 132, D-SLP 134) discovered by the SET that can provide location services to the SET at or in the vicinity of its current location. Additionally, the SET can receive the addresses of other authorized D-SLPs from the H-SLP that can provide location services to the SET at or in the vicinity of its current location.

Alternatively, this procedure may also be invoked by a SET to obtain authorization from the H-SLP for D-SLPs discovered by the SET that provide location services at some location remote from the SET (e.g. a location that the user of the SET expects to visit at some later time). The H-SLP is not compelled to provide authorization in such cases, but may nevertheless chose to do so in order to improve location support. Additionally, there may be an arrangement between the provider of an H-SLP and the provider of a D-SLP to avoid service overload to the D-SLP. The arrangement may limit the number of SETs for which the D-SLP can be simultaneously authorized.

At 405, the SET 116 starts a procedure to eventually obtain the addresses of up to 10 authorized D-SLPs (e.g., D-SLP 132, D-SLP 134) from the H-SLP 142 that are able to provide location services to the SET at or in the vicinity of its current location or, in some cases, at some remote location. The procedure may be invoked under any of the following conditions once any minimum retry period for any previous invocation of this procedure has expired:

a. The SET discovers a D-SLP address applicable to its current location or to a remote location that it would like to have authorized.
 b. In the case of D-SLP authorization, the SET is unable to obtain adequate positioning service from the H-SLP and either has no currently authorized D-SLPs or has currently authorized D-SLPs, access to which is forbidden due to geographic area or access network restrictions.

In some embodiments, the procedure is invoked under a condition not described above. Additionally, the SET 116 can take appropriate action to establish a secure Transport Layer Security (TLS) connection to the H-SLP.

At 410, the SET 116 can use the default address provisioned by the Home Network to establish a secure TLS connection to the H-SLP and sends a SUPL START message to start a positioning session with the H-SLP. The SUPL START message contains session-id, SET capabilities and Location ID (lid) parameters. The SET capabilities may include the supported positioning methods (e.g., SET-Assisted A-GPS, SET-Based A-GPS) and associated positioning protocols (e.g., RRLP, RRC, TIA-801 or LPP). The SUPL START message also contains an SLP Query parameter (slpQuery) indicating whether the SET requests D-SLP addresses. For a D-SLP request, the SET can include a list of any D-SLP addresses currently authorized by the H-SLP and may include a list of preferred D-SLP addresses (e.g. discovered D-SLP addresses) and/or a list of not preferred D-SLP addresses (e.g. D-SLPs the SET could not previously obtain service from). The SET can also include its current position estimate if it is available.

At 415, the H-SLP proceeds to 430 if it does not need to obtain the position of the SET or verify any position provided at 410. Otherwise, the H-SLP sends a SUPL RESPONSE message to the SET. The SUPL RESPONSE message contains the session-id, and the intended positioning method (posMethod).

At 420, the SET can send a SUPL POS INIT message to the H-SLP. The SUPL POS INIT message contains the session-id, the Location ID, SET capabilities and optionally a SUPL POS message carrying LPP and/or TIA-801 positioning protocol messages. The SET may also provide its position. If a position retrieved in, or calculated based on information received in, the SUPL POS INIT message is available that meets the required Quality of Positioning (QoP), the H-SLP may directly proceed to 430 and not engage in a SUPL POS session.

At 425, the SET and H-SLP engage in a SUPL POS message exchange to calculate a position. The H-SLP calculates the position estimate based on the received positioning measurements (i.e., SET-Assisted) or the SET calculates the position estimate based on assistance obtained from the H-SLP (i.e., SET-Based).

Once any position calculation is complete, the H-SLP determines a new set of authorized D-SLP addresses if D-SLP addresses were requested. The H-SLP sends a SUPL END message to the SET with an SLP Authorization parameter (e.g., slpAuthorization) containing a list of authorized D-SLP addresses if D-SLP addresses were requested. The addresses in each list are included in priority order, highest priority first, and can replace any previous list of authorized D-SLPs that the SET may have received previously from the H-SLP. For each provided D-SLP address, the H-SLP may include the service duration for which the D-SLP address can be considered valid, the service area within which the D-SLP may be accessed, a list of serving access networks from which the D-SLP may be accessed and a combination type that defines how the service area and access network restrictions are to be combined. For any authorized D-SLP address, the H-SLP may also provide a list of services that the SET is permitted to engage in with this D-SLP and may provide a preference for accessing a D-SLP versus accessing the H-SLP for any SET initiated location request. The H-SLP may also include a SET Token 150 for each authorized D-SLP. The public key certificate of the H-SLP (e.g., SLP certificate 160) which the D-SLP may require to verify the authenticity of the SET Token 150 may also be sent or certified as part of the SLP Authorization parameter. The H-SLP may also provide any position estimate computed at 425. The SET can release the TLS connection to the H-SLP and release all resources related to this session. The H-SLP can release all resources related to this session.

At 435, the SET may subsequently access for SET initiated location services any D-SLP authorized by the H-SLP at 430 based on the following principles:
 a. D-SLPs can be accessed in priority order—where a lower priority address is accessed only when all higher priority addresses are precluded by some other condition or cannot provide service.
 b. A D-SLP may only be accessed so long as any service duration for the D-SLP has not expired.
 c. A D-SLP may only be accessed if the SET satisfies any provided service area and access network restrictions.
 d. For D-SLP access, a SET may only request an authorized service.
 e. For D-SLP access, the SET can follow any preference provided for H-SLP access.
 f. If access to a D-SLP or the H-SLP fails (e.g. the SET cannot establish a secure IP connection or the D-SLP or H-SLP cannot provide the required service), a SET may access another D-SLP or the H-SLP according to the above rules.
 g. For D-SLP access, the SET may send the SLP Certificate 160 only during the first D-SLP access after D-SLP authorization until a new D-SLP authorization takes place.
 h. For D-SLP access, the SET may send the SET Token 150 to the D-SLP each time the SET accesses the D-SLP.

According to some embodiments, not all the principles listed in 435 needs to be followed. For example, according to one embodiment, a SET may need to abide by one or more of the principles listed in 435. In some embodiments, one or more principles other than those listed above may be followed in addition to or instead of one or more of the principles listed above.

H-SLP Authorization of One or More D-SLP (Unsolicited)

According to some embodiments, a procedure may be invoked by the H-SLP 142 to provide authorized D-SLP 132 addresses to a SET 116 when not initially requested by SET 116 as was the case in FIGS. 4A and 4B. The procedure can be applicable when a SUPL END is sent by the H-SLP 142 to normally terminate any SUPL session.

Referring to FIG. 4C, at 450, the SET and H-SLP engage in an immediate or deferred SUPL session that may be initiated by the SET or by the H-SLP.

Once the SUPL session is complete, at 455, the H-SLP determines a set of authorized D-SLP addresses which may be based on the current SET location and current access network(s) used by the SET (e.g., as obtained by the H-SLP at 450). The H-SLP 142 sends a SUPL END message to the SET 116 with an SLP Authorization parameter (slpAuthorization) containing a list of authorized D-SLP addresses. The addresses in each list are included in priority order, highest priority first, and replace any previous list of authorized D-SLPs that the SET 116 may have received from the H-SLP 142. For each provided D-SLP address, the H-SLP 142 may include the service duration for which the D-SLP address can be considered valid, the service area within which the D-SLP address may be accessed, a list of serving access networks from which the D-SLP address may be accessed and a combination type that defines how the service area and access network restrictions are to be combined. In the case of a provided D-SLP address, the H-SLP 142 may provide a list of services that the SET 116 is permitted to engage in with this D-SLP 132. The H-SLP 142 may also provide a preference for accessing the H-SLP versus accessing a D-SLP and/or may provide a request for notifying the H-SLP when a D-SLP is accessed. The H-SLP may also include a SET Token 150 for each authorized D-SLP. The public key certificate of the H-SLP (e.g., SLP certificate 160) which the D-SLP may require to verify the authenticity of the SET Token 150 may also be sent or certified as part of the SLP Authorization parameter. The SET can release the TLS connection to the H-SLP and release all resources related to the session. The H-SLP can release all resources related to the session.

At 460, the SET 116 may subsequently access any D-SLP provided by the H-SLP at 455 for SET initiated location services and/or may accept network initiated location requests from any such D-SLP. The rules for such access may be the same as those defined at 435 in FIG. 4B in the case of a D-SLP authorized by the H-SLP.

D-SLP Authenticating a SET Using a SET Token (e.g., 308, 310)

Figure 5A:
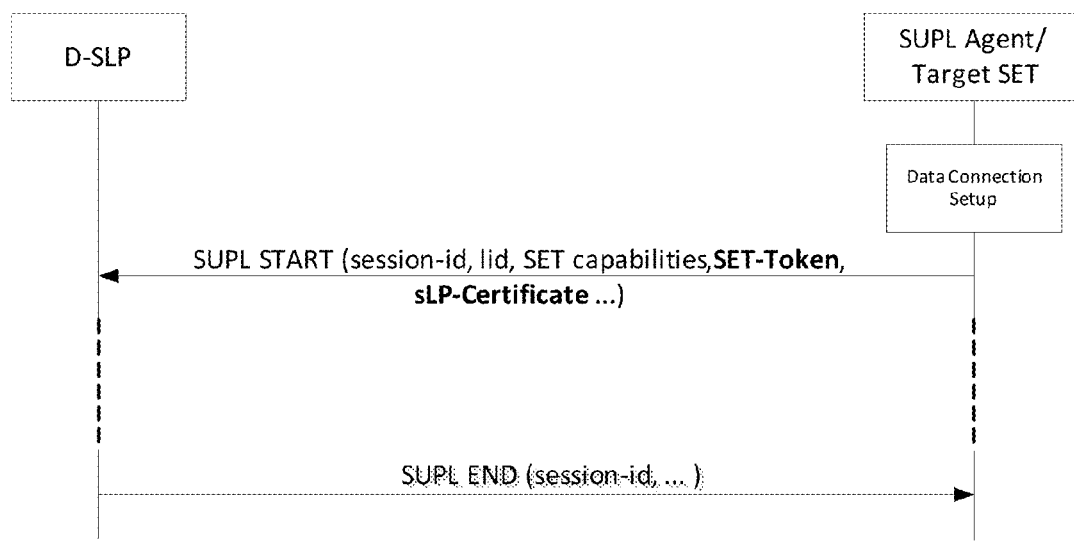
FIG. 5A illustrates a method of a D-SLP authenticating a SET using a SET Token, according to one embodiment.

Referring to FIG. 5A, the SET 116 can use the SET Token 150 when accessing an authorized D-SLP 132. The SET first establishes a secure connection to the D-SLP 132 and may authenticate the D-SLP (e.g. using a public key certificate provided to the SET by the D-SLP) but the D-SLP 132 may be unable to authenticate the SET using conventional means (e.g. using ACA or GBA). The SET may then transfer the SET Token 150 received earlier from the SET's H-SLP 142 (e.g. according to FIG. 4A, 4B or 4C) to the D-SLP 132 in the first SUPL message sent to the D-SLP 132 by the SET—e.g. in a SUPL START message. The SET Token 150 serves to enable the D-SLP 132 to authenticate the SET 116 and can also be used to provide additional information such as for example a billing code. The SET also sends the public key certificate of the H-SLP 142 to the D-SLP 132 (SLP Certificate 160). The SLP Certificate parameter may be sent only once during the first D-SLP access by the SET after D-SLP authorization (i.e., the D-SLP can store the SLP Certificate parameter for use for any subsequent access by the SET). Following D-SLP authentication of the SET using the SET Token 150 and possibly SLP certificate 160, a normal SUPL session may occur in which the D-SLP 132 may provide location services to the SET 116 (e.g. provision of assistance data or a location estimate for SET 116). The SUPL session may later terminate with the D-SLP sending a SUPL END message to the SET.

D-SLP Authenticating a SET Using a SET Token (SET Initiated Services)

Figure 5B:
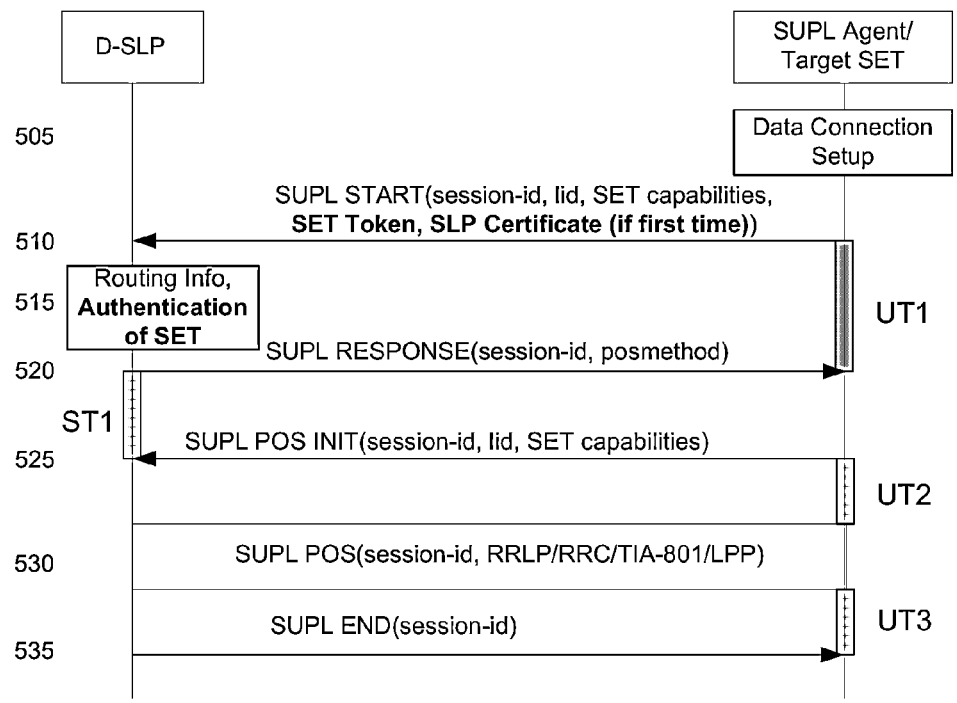
FIG. 5B illustrates a method of a SET obtaining authenticated location service from a D-SLP using a SET Token, according to one embodiment.

FIG. 5B illustrates a SET 116 obtaining authenticated location service from a D-SLP 132.

At 505, the SUPL Agent on the SET receives a request for position from an application running on the SET. The SET takes appropriate action in establishing or resuming a secure connection to an authorized D-SLP (e.g. using a D-SLP address provided or verified earlier by the H-SLP 142). In establishing the secure connection, the SET may be able to authenticate the D-SLP (e.g. via a public key certificate provided by the D-SLP) but the D-SLP may be unable to authenticate the SET through conventional means (e.g. ACA, device certificates or GBA). The D-SLP may still allow the establishment of a secure connection in expectation of authenticating the SET later at 515. If the authentication of the SET did not take place at 515 or failed, the D-SLP may terminate the SUPL session by sending a SUPL END message (not shown in FIG. 5B).

At 510, the SET sends a SUPL START message to start a positioning session with the D-SLP. The SUPL START message contains session-id, SET capabilities and Location ID (lid) parameters. The SET capabilities include the supported positioning methods (e.g., SET-Assisted A-GPS, SET-Based A-GPS) and associated positioning protocols (e.g., RRLP, RRC, TIA-801 or LPP). Additionally, the SUPL START can include the SET Token 150 and, if this is the first time the D-SLP is accessed, the SLP certificate 160. The SET may send the SET Token 150 and SLP certificate 160 exactly as received from the H-SLP and may not need to interpret their contents or decode and re-encode the contents which may simplify SET implementation. If a previously computed position which meets a requested QoP is available at the D-SLP the D-SLP can directly proceed to 535 and send the position to the SET in the SUPL END message.

At 515, the D-SLP can authenticate of the SET, using the SET Token 150 and SLP certificate 160 received at 510 as described previously.

At 520, consistent with the SUPL START message including posmethod(s) supported by the SET, the D-SLP can determine the posmethod. If required for the posmethod, the D-SLP can use the supported positioning protocol (e.g., RRLP, RRC, TIA-801 or LPP) from the SUPL START message. The D-SLP can respond with the SUPL RESPONSE to the SET. The SUPL RESPONSE also contains the posmethod. If, however, a position retrieved or calculated based on information received in the SUPL START message meets the requested QoP, the D-SLP may directly proceed to 535.

At 525, after the SET receives the SUPL RESPONSE from D-SLP, the SET sends a SUPL POS INIT message. The SUPL POS INIT message contains at least session-id, SET capabilities and Location ID (lid). The SET capabilities include the supported positioning methods (e.g., SET-Assisted A-GPS, SET-Based A-GPS) and associated positioning protocols (e.g., RRLP, RRC, TIA-801 or LPP). The SET may include the first SUPL POS element in the SUPL POS INIT message. The SET may set the Requested Assistance Data element in the SUPL POS INIT. If a position retrieved or calculated based on information received in the SUPL POS INIT message is available which meets a required QoP, the D/H-SLP may directly proceed to 535 and not engage in a SUPL POS session.

At 530, the SET and the D-SLP can exchange several successive positioning procedure messages. The D-SLP can calculate the position estimate based on the received positioning measurements (SET-Assisted) or the SET calculates the position estimate based on assistance obtained from the D-SLP (i.e., SET-Based).

At 535, once the position calculation is complete the D-SLP can send the SUPL END message to the SET informing it that no further positioning procedure will be started and that the location session is finished. Depending on the positioning method and the used positioning protocol, the D-SLP may add the determined position to the SUPL END message. The SET can release the secure connection and release all resources related to this session. The D-SLP can release all resources related to this session.

D-SLP Authenticating a SET Using a SET Token (D-SLP Initiated Services)

According to some embodiments a D-SLP 132 can initiate the SUPL collaboration. For example, A SUPL Agent 133 can request the location of a SET 116 from its associated D-SLP 132 and the D-SLP 132 would then instigate a SUPL session with the SET 116 to obtain the location. The SET Token 150 and SLP certificate 160 are then carried in the SUPL POS NIT message and the SUPL session is illustrated in FIG. 5C.

Figure 5C:
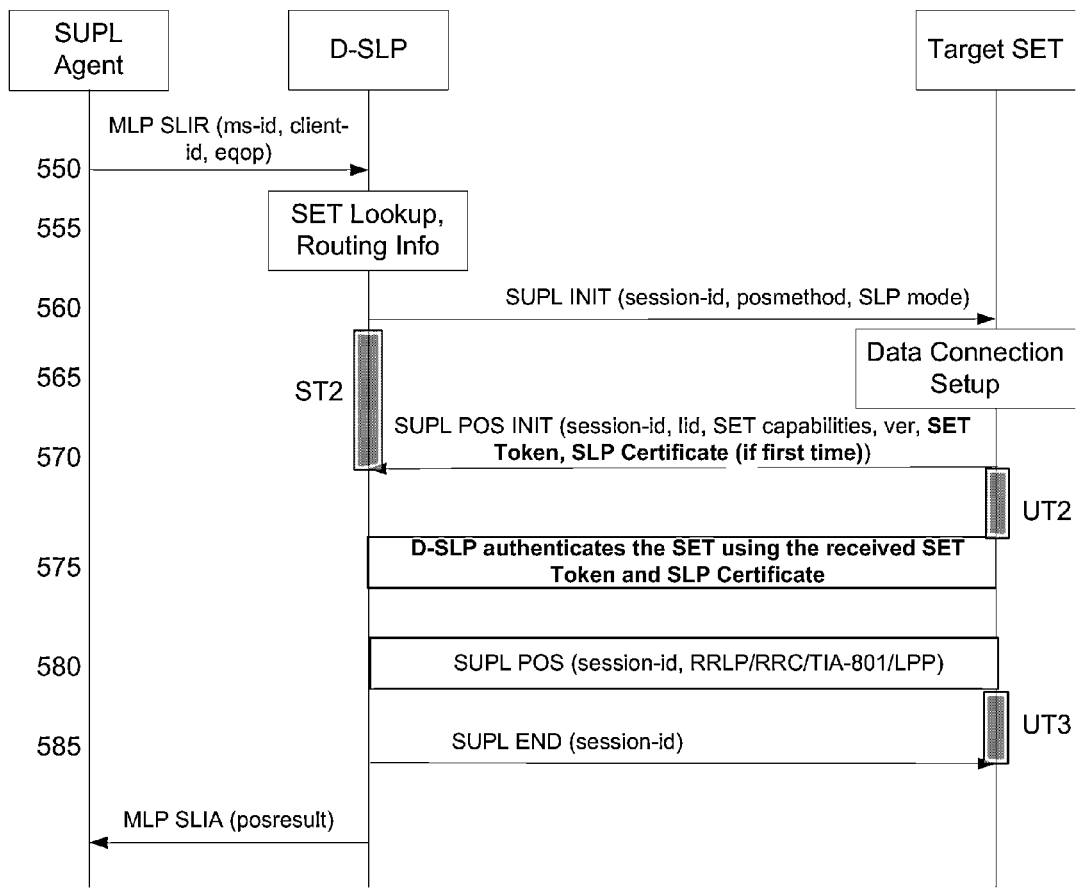
FIG. 5C illustrates a method of a D-SLP locating a SET using a SET Token, according to one embodiment.

FIG. 5C illustrates an exemplary method of a D-SLP 132 locating a SET 116.

At 550, a SUPL Agent issues a location request (e.g. carried in an OMA MLP SLIR message) to the D-SLP, with which SUPL Agent is associated. The D-SLP can authenticate the SUPL Agent and check if the SUPL Agent is authorized for the service it requests, based on the SUPL Agent client-id received. Further, based on the received ms-id the D-SLP can apply subscriber privacy against the SUPL Agent client-id.

At 555, the D-SLP may verify that it is able to communicate with the SET (e.g. knows the SET IP address or is able to send a non-IP message to the SET via, for example, SMS).

At 560, the D-SLP initiates the location session with the SET by sending a SUPL INIT message to the SET—e.g. using User Datagram Protocol (UDP) over IP or using Short Message Service (SMS). The SUPL INIT message contains at least session-id, proxy/non-proxy mode indicator and the intended positioning method. If the result of any privacy check at 550 indicates that notification or verification to the target subscriber is needed, the D-SLP can also include the Notification element in the SUPL INIT message. Before the SUPL INIT message is sent, the D-SLP also computes and stores a hash of the message. Additionally, the SUPL INIT can include the D-SLP Address.

At 565, the SET 116 can analyze the received SUPL INIT. If found to be non-authentic the SET may take no further actions. Otherwise the SET may take action preparing for establishment or resumption of a secure connection to the D-SLP.

At 565, the SET can also evaluate the SUPL Notification rules and follow the appropriate actions. The SET may also check the proxy/non-proxy mode indicator to determine if the D-SLP uses proxy or non-proxy mode. In this case, proxy mode is used, and the SET can establish a secure connection to the D-SLP using the D-SLP address indicated in the SUPL INIT that may also have been provided or verified by the H-SLP. In establishing the secure connection, the SET may be able to authenticate the D-SLP (e.g. via a public key certificate provided by the D-SLP) but the D-SLP may be unable to authenticate the SET through conventional means (e.g. ACA, device certificates or GBA). The D-SLP may still allow the establishment of a secure connection in expectation of authenticating the SET later at 575. If the authentication of the SET did not take place at 575 or failed, the D-SLP may terminate the SUPL session by sending a SUPL END message (not shown in FIG. 5C).

At 570, the SET then sends a SUPL POS INIT message to start a positioning session with the D-SLP. The SUPL POS INIT message can contain at least session-id, SET capabilities, a hash of the received SUPL INIT message (ver) and Location ID (lid). The SET capabilities may include the supported positioning methods (e.g., SET-Assisted A-GPS, SET-Based A-GPS) and associated positioning protocols (e.g., RRLP, RRC, TIA-801 or LPP). The SET may provide its position, if this is supported. The SET may set the Requested Assistance Data element in the SUPL POS INIT. Additionally, the SUPL POS INIT can also carry the SET Token 150 and, if this is the first time the D-SLP is accessed, the SLP certificate 160. The SET may send the SET Token 150 and SLP certificate 160 exactly as received from the H-SLP and may not need to interpret their contents or decode and re-encode the contents which may simplify SET implementation. If a position retrieved from or calculated based on information received in the SUPL POS INIT message is available that meets the required QoP, the D-SLP may directly proceed to 585 after first authenticating the SET at 575 and not engage in a SUPL POS session at 580.

At 575, the D-SLP can check that the hash of SUPL INIT matches the one it has computed for this particular session. Additionally, the D-SLP authenticates the SET using the received SET Token 150 and SLP certificate 160. Based on the SUPL POS INIT message including posmethod(s) supported by the SET the D-SLP can then determine the posmethod. If required for the posmethod the D-SLP can use the supported positioning protocol (e.g., RRLP, RRC, TIA-801 or LPP) from the SUPL POS INIT message. The SET and the D-SLP exchange several successive positioning procedure messages. The D-SLP calculates the position estimate based on the received positioning measurements (SET-Assisted) or the SET calculates the position estimate based on assistance obtained from the D-SLP (SET-Based).

At 580, once the position calculation is complete the D-SLP can send the SUPL END message to the SET informing it that no further positioning procedure will be started and that the location session is finished. The SET can release the secure connection to the D-SLP and release all resources related to this session.

At 585, the D-SLP can sends the position estimate back to the SUPL Agent (e.g. in an OMA MLP SLIA message) and the D-SLP can release all resources related to this session.

SET Token and SLP Certificate

FIG. 6A illustrates the content of the SET Token 150, according to some embodiments. The first column of FIG. 6A shows the individual parameters contained in the SET Token 150 and the second column describes the content and significance of each parameter. In the first column, the nesting level of any parameter is shown using "greater than" (">") symbols where the outermost nesting level is indicated by zero such symbols, the next level by one such symbol and the next (third) level by two such symbols (">>"). The SET Token parameter is used for SET authentication and authorization during D-SLP access. SET Token 150 is generated by the H-SLP during D-SLP authorization and contains SET and H-SLP specific data digitally signed by the H-SLP. SET Token 150 is provided to the SET during D-SLP Authorization as part of the SLP Authorization parameter. During D-SLP access, SET Token 150 is provided by the SET to the D-SLP for SET authentication and authorization. SET Token 150 may be defined as a Bit String or octet string and may be transparent to the SET. Only the H-SLP and D-SLP need to know how to encode/decode and interpret the content of the Bit String or octet string. Thus, the SET may just send to a D-SLP the bit string or octet string received from the H-SLP that contains the SET Token 150 with no interpretation or re-encoding of the content. The content of SET Token 150 including the encoding is defined in other sections herein.

Additionally, this parameter can be a Bit String or octet string in the SUPL User Plane Location Protocol (ULP) and may not need to be decoded by the SET. According to some embodiments, the SET only passes this parameter on to the D-SLP during D-SLP access.

According to some embodiments, the SET Token 150 and the SLP Certificate 160 are transparent to the SET 116 (e.g. may not be decoded or encoded by a SET), and they can be sent by the H-SLP 142 as bit strings or octet strings. For example, the SET 116 may have no other use for the SET Token 150 and SLP Certificate 160 than storing them during D-SLP authorization and forwarding them to the D-SLP during D-SLP access. The SLP certificate 160, if provided by the H-SLP, may be sent only once by the SET during initial D-SLP access after D-SLP authorization. The SET may store the SET Token 150 until revoked or until the D-SLP service duration has expired. According to some embodiments, the service duration, which can be visible to the SET 116 (e.g. as it may be provided to SET 116 as part of D-SLP authorization information by the H-SLP), and authorization duration, which can be visible to the D-SLP 132 (e.g. as it may be part of SET Token 150), can be the same. Then, the SET 116 may send the SET Token 150 once during each D-SLP access (e.g., in the initial access message for any new session with the D-SLP). The D-SLP 132 can use the SET Token 150 to authenticate the SET 116. For example, the D-SLP 132 can verify the digital signature of the H-SLP 142 (e.g. using the SLP certificate 160) and can verify inclusion of its own identity and that the authorization time and duration are valid (e.g., includes the current time). The H-SLP 142 may also use any provided SET position to further authenticate the SET 116 (e.g. for a recent authorization may verify that the current SET position is nearby to the provided position in the SET Token 150).

In some instances, the D-SLP 132 may store the SLP certificate 160 after receiving the SLP certificate 160 from the SET 116, until the SET Token 150 expires or is overwritten by a new SET Token.

Additionally, the H-SLP 142 can revoke a SET Token 150 by performing a new D-SLP authorization with either a new SET Token or with no SET Token. Any previous SET Token 150 can then be deleted by the SET 116 and replaced with a new SET Token, if provided.

Alternatively, a SET Token 150 can expire when the duration for the associated D-SLP expires. When a SET Token 150 has expired, the SET may delete the SET Token 150 and cease accessing the D-SLP.

The SET Token parameters can be used for SET authentication and authorization during D-SLP access. The SET Token 150 can be generated by the H-SLP 142 during D-SLP authorization and contains SET, H-SLP and D-SLP specific data digitally signed by the H-SLP. The SET Token 150 can be provided to the SET during D-SLP Authorization as part of the SLP Authorization parameter. During D-SLP access, SET Token 150 is provided by the SET to the D-SLP for SET authentication and authorization. SET Token 150 may be defined as a Bit String and may be transparent to the SET. Only H-SLP and D-SLP need to know how to encode/decode the content of the Bit String. The content of SET Token 150 including the encoding is defined elsewhere herein (e.g. in FIG. 6A). This parameter may be a Bit String in ULP and does not need to be decoded by the SET. The SET only passes this parameter on to the D-SLP during D-SLP access.

Scenarios where this may be needed include those where GBA is not deployed or where ACA is not applicable. For example, this may occur if the access network used for D-SLP access does not meet ACA requirements such as supporting a spoofing free network environment and/or enabling the binding of SET IP address to SET identity to be verified.

The SET Token 150, which the H-SLP sends to the SET as part of the D-SLP authorization is defined for each authorized D-SLP. The SET includes SET Token 150 in any initial SUPL message sent to the D-SLP during session establishment. SET Token 150 contains SET and H-SLP related information digitally signed by the H-SLP.

Authentication of the SET Token 150 by the D-SLP may be enabled by providing the D-SLP with the public key certificate of the H-SLP in the case that the D-SLP does not already have this. To this end the H-SLP sends its public key certificate to the SET (SLP Certificate parameter) during D-SLP authorization which the SET then also sends to the D-SLP during session establishment.

This allows the D-SLP to authenticate the SET and authorize (or reject) access. SET Token 150 may also include non-security related information such as for example a billing code. By way of SET Token 150, H-SLP and D-SLP can securely exchange information required for authentication, authorization, billing and other purposes.

Referring the FIG. 6A, the SET Token 150 may include the following information:

1) SET Token Content 601 (which may contain items 602, 612, 613));
2) SET Token Body 602 (which may contain items 603, 604, 605, 606, 607, 608, 609, 610, 611);
3) SET Identity 603 (e.g., IMSI, MSISDN, IP address);
4) Authorizing SLP Id 604 (e.g., IP address or FQDN for H-SLP 142);
5) D-SLP Id 605 (e.g., IP address or FQDN for D-SLP 132);
6) SET position 606 (if available);
7) Time 607 and duration 608 of D-SLP authorization;
8) Authorizing SLP Name 609 (optional);
9) Authorizing SLP Unique ID 610 (optional);
10) Public key 611 for digital signature 613 (optional);
11) Algorithm Identifier 612 for digital signature 613; and/or
12) Digital signature 613 of the authorizing SLP (e.g. H-SLP 142).

According to some embodiments, 601 and 602 can essentially be containers for other parameters (e.g., items 603-613). Inclusion of the authorization time and duration ensures that each certificate sent to a SET will be unique and can only be used during the allowed authorization period.

FIG. 6B illustrates the content of SLP Certificate 160 including the encoding, according to some embodiments.

The SLP Certificate 160 may be as defined in International Telecommunication Union (ITU) X.509 standard—i.e. may be based on an existing standard. The SET Token may be defined as part of SUPL ULP and may be based on, though not identical to, the X.509 definition. Inclusion of the authorization time and duration may ensure that each certificate sent to a SET will be unique and can only be used during the allowed authorization period.

The SLP Certificate 160 represents the public key certificate of the H-SLP 142. The D-SLP 132 may require this parameter to verify the authenticity of the SET Token 150. The H-SLP 142 may send the SLP Certificate 160 to the SET during D-SLP Authorization. The SET 116 then sends the SLP Certificate 160 to the D-SLP 132 once during initial D-SLP access after D-SLP Authorization. The SET may send the SLP Certificate 160 only once and the D-SLP may store the SLP certificate 160. Additionally, an SLP certificate 160 may not be needed for a D-SLP that already knows the H-SLP public key (e.g. as obtained via an offline process).

According to one embodiment, when the SLP certificate 160 is of type bit string, the SET does not need to decode this parameter but only passes it on to the D-SLP during D-SLP access.

The first certificate in the sequence may provide or certify the public key and associated algorithm for the SET Token Content 601. Each succeeding certificate may certify the public key and associated algorithm for the preceding certificate. ITU ASN.1 DER encoding may be used to align with X.509 certificate encoding and enable reuse of existing certificates.

According to some embodiments, a SET 116 may not perform encoding of the SET Token 150 and SLP Certificate 160 content; however the SET 116 may optionally perform the decoding.

For example, the SLP Signature 613 field may contain a digital signature computed upon the ASN.1 encoded SET Token Body 602. The ASN.1 encoded sET-Token-Body may be used as the input to the signature function. The signature value may be encoded as a BIT STRING and included in the SLP Signature 613 field.

The algorithm identifier 612 can be used to identify a cryptographic algorithm. The OBJECT IDENTIFIER component may identify the algorithm such as DSA with SHA-1. The contents of the optional parameters field may vary according to the algorithm identified.

In some embodiments, the SET may receive the SET Token 150 and SLP certificate 160 from a previously authorized D-SLP rather than an H-SLP in the case that a D-SLP authorizes another D-SLP. For example, if D-SLP 132 in FIG. 1B authorizes SET 116 access to D-SLP 134 after SET 116 has established a secure connection to D-SLP 132, D-SLP 132 may provide a SET Token 150 and SLP certificate 160 to enable SET 116 to securely access D-SLP 134. In this case, SET 116 may use a SET Token 150 and SLP certificate 160 provided by H-SLP 142 to first securely access D-SLP 132 and subsequently use a different SET Token 150 and SLP certificate 160 provided by D-SLP 132 to later securely access D-SLP 134.

In some other embodiments, a SET may obtain a SET Token 150 and an SLP certificate 160 from a first H-SLP in order to obtain authenticated access to a second H-SLP. This may occur when a SET is configured to access more than one H-SLP but is only able to obtain authenticated access to one H-SLP (e.g. a particular H-SLP or any H-SLP) by conventional means. In such a case, the SET Token 150 provided by the first H-SLP in response to the SET obtaining authenticated access to the first H-SLP may contain the identities (e.g. addresses) of the first H-SLP, second H-SLP and the SET and may further contain a digital signature of the first H-SLP. The SET may then access the second H-SLP and may provide the second H-SLP with the SET Token 150 received from the first H-SLP in order to obtain authenticated access to the second H-SLP. Additional means to support authenticated access to the second H-SLP may also be used by the first H-SLP and SET as described previously for supporting authenticated access to a D-SLP. With regard to obtaining authenticated access, the D-SLP and second H-SLP may behave in the same or in a similar manner and may be treated the same or similarly by the SET and the first H-SLP.

Figure 7:
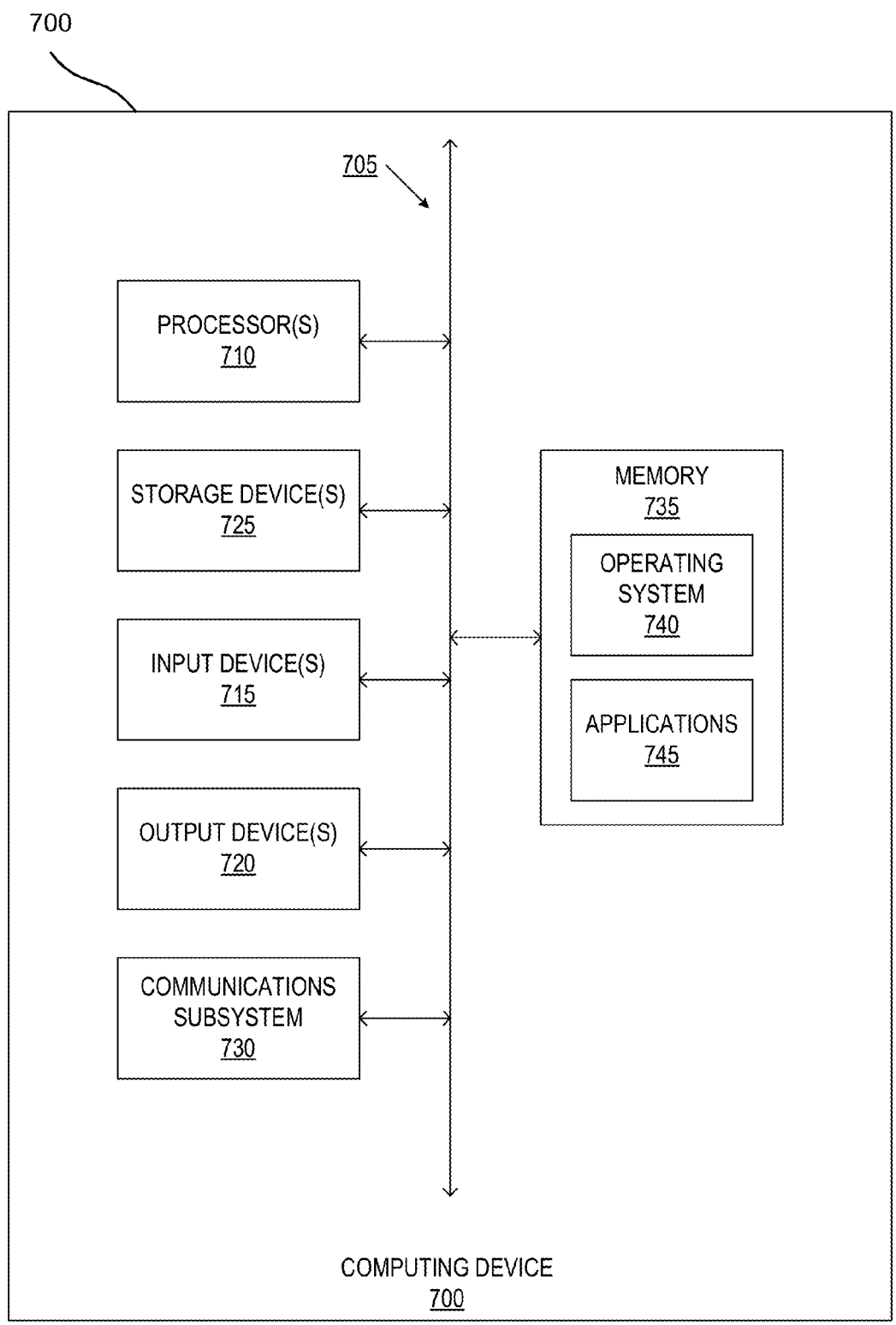
FIG. 7 is an exemplary computer system of various embodiments.

An example of a computing system in which various aspects of the disclosure may be implemented is now described with respect to FIG. 7. The computing system may exemplify any of SET 116, SET 122, D-SLP 132, D-SLP 134 and H-SLP 142 in FIG. 1B and as referenced herein elsewhere. According to one or more aspects, a computer system as illustrated in FIG. 7 may be incorporated as part of a computing device, which may implement, perform, and/or execute any and/or all of the features, methods, and/or method steps described herein. For example, computer system 700 may represent some of the components of a hand-held device. A hand-held device may be any computing device with an input sensory unit, such as a camera and/or a display unit. Examples of a hand-held device include but are not limited to video game consoles, tablets, smart phones, and mobile devices. In one embodiment, the system 700 is configured to implement the device 200 described above. FIG. 7 provides a schematic illustration of one embodiment of a computer system 700 that can perform the methods provided by various other embodiments, as described herein, and/or can function as the host computer system, a remote kiosk/terminal, a point-of-sale device, a mobile device, a set-top box, and/or a computer system. FIG. 7 is meant only to provide a generalized illustration of various components, any and/or all of which may be utilized as appropriate. FIG. 7, therefore, broadly illustrates how individual system elements may be implemented in a relatively separated or relatively more integrated manner.

The computer system 700 is shown comprising hardware elements that can be electrically coupled via a bus 705 (or may otherwise be in communication, as appropriate). In one embodiment, the bus 705 can be used for the processor 230 to communicate between cores and/or with the memory 232. The hardware elements may include one or more processors 710 (e.g., processor 230, TX data processor 214, TX MIMO processor 220, RX data processor 242), including without limitation one or more general-purpose processors and/or one or more special-purpose processors (such as digital signal processing chips, graphics acceleration processors, and/or the like); one or more input devices 715, which can include without limitation a camera, a mouse, a keyboard and/or the like; and one or more output devices 720, which can include without limitation a display unit, a printer and/or the like.

The computer system 700 may further include (and/or be in communication with) one or more non-transitory storage devices 725, which can comprise, without limitation, local and/or network accessible storage, and/or can include, without limitation, memory 232, memory 272, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data storage, including without limitation, various file systems, database structures, and/or the like.

The computer system 700 might also include a communications subsystem 730, which can include without limitation a modem, a network card (wireless or wired), an infrared communication device, a wireless communication device and/or chipset (such as a Bluetooth® device, an 802.11 device, a WiFi device, a WiMax device, cellular communication facilities, etc.), and/or the like. According to one embodiment of the present invention, the transmitter 222 and receiver 254 can be examples of a communication subsystem 730. The communications subsystem 930 may permit data to be exchanged with a network (such as the network described below, to name one example), other computer systems, and/or any other devices described herein. In many embodiments, the computer system 700 may further comprise a non-transitory working memory 735, which can include a RAM or ROM device, as described above. According to one embodiment of the present invention, the memory 232 and the memory 272 can be examples of a non-transitory working memory 735.

The computer system 700 also can comprise software elements, shown as being currently located within the working memory 735, including an operating system 740, device drivers, executable libraries, and/or other code, such as one or more application programs 745, which may comprise computer programs provided by various embodiments, and/ or may be designed to implement methods, and/or configure systems, provided by other embodiments, as described herein. Merely by way of example, one or more procedures described with respect to the method(s) discussed above, for example as described with respect to FIG. 3, might be implemented as code and/or instructions executable by a computer (and/or a processor within a computer); in an aspect, then, such code and/or instructions can be used to configure and/or adapt a general purpose computer (or other device) to perform one or more operations in accordance with the described methods. For example the SET Token 150 and SLP certificate 160 can be stored in working memory 735.

A set of these instructions and/or code might be stored on a computer-readable storage medium, such as the storage device(s) 725 described above. In some cases, the storage medium might be incorporated within a computer system, such as computer system 700. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the computer system 700 and/or might take the form of source and/or installable code, which, upon compilation and/or installation on the computer system 700 (e.g., using any of a variety of generally available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

Some embodiments may employ a computer system (such as the computer system 700) to perform methods in accordance with the disclosure. For example, some or all of the procedures of the described methods may be performed by the computer system 700 in response to processor 710 executing one or more sequences of one or more instructions (which might be incorporated into the operating system 740 and/or other code, such as an application program 745) contained in the working memory 735. Such instructions may be read into the working memory 735 from another computer-readable medium, such as one or more of the storage device(s) 725. Merely by way of example, execution of the sequences of instructions contained in the working memory 735 might cause the processor(s) 710 to perform one or more procedures of the methods described herein, for example one or more of the elements of the method described with respect to FIG. 3.

The terms "machine-readable medium" and "computer-readable medium," as used herein, refer to any medium that participates in providing data that causes a machine to operate in a specific fashion. In an embodiment implemented using the computer system 700, various computer-readable media might be involved in providing instructions/code to processor(s) 710 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media.

Non-volatile media include, for example, optical and/or magnetic disks, such as the storage device(s) 725. Volatile media include, without limitation, dynamic memory, such as the working memory 735. Transmission media include, without limitation, coaxial cables, copper wire and fiber optics, including the wires that comprise the bus 705, as well as the various components of the communications subsystem 730 (and/or the media by which the communications subsystem 730 provides communication with other devices). Hence, transmission media can also take the form of waves (including without limitation radio, acoustic and/or light waves, such as those generated during radio-wave and infrared data communications). According to some embodiments, the H-SLP 142, SET 116, and/or D-SLP 132 can utilize a communication subsystem 730 to communication with each other.

In one or more examples, the functions described may be implemented in hardware, software, firmware, or any combination thereof. If implemented in software, the functions may be stored on or transmitted over as one or more instructions or code on a computer-readable medium. Computer-readable media may include computer data storage media. Data storage media may be any available media that can be accessed by one or more computers or one or more processors to retrieve instructions, code and/or data structures for implementation of the techniques described in this disclosure. "Data storage media" as used herein refers to manufactures and does not refer to transitory propagating signals. By way of example, and not limitation, such computer-readable media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above may also be included within the scope of computer-readable media.

The code may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware stored on computer-readable media.

Various examples have been described. These and other examples are within the scope of the following claims.

What is claimed is:

1. A method for obtaining a secure connection between a first server and a client, the method comprising:
    establishing a secure communication session between a second server and the client, wherein the secure communication session is established directly between the second server and the client;
    receiving, by the client, a client token using the secure communication session, wherein the client token is defined for the first server and comprises (i) data identifying the first server, the second server, and the client, and (ii) a digital signature of the second server;
    receiving, by the client, a digital certificate using the secure communication session, the digital certificate comprising information to enable authentication of the digital signature to the first server;
    requesting, by the client, secure communication access to the first server, wherein the requesting includes transmitting a message comprising the client token and the digital certificate to the first server via a temporary communication access accepted by the first server;
    and receiving, by the client, a grant of secure communication access to the first server based on authentication of the client by the first server, wherein the authentication is based on the client token validating the client, the digital signature validating the client token, and the digital certificate validating the digital signature, and wherein the grant of secure communication access that was received was based at least in part on the first server having obtained a location of the client and having transmitted the location of the client to an external client.

2. The method of claim 1, wherein the transmitting of the digital certificate to the first server occurs only once, and the digital certificate is sent in an initial access message from the client to the first server.

3. The method of claim 1, wherein the client token and digital certificate comprise bit strings, and the client token and digital certificate are not encoded or decoded by the client.

4. The method of claim 1, wherein the second server comprises a home secure user plane location (SUPL) location platform (H-SLP), the client comprises a SUPL Enabled Terminal (SET) and the first server comprises a Discovered SLP (D-SLP).

5. The method of claim 4, wherein the SET has been authenticated by the H-SLP using an alternative client authentication (ACA) method, a generic bootstrapping architecture (GBA), or a device certificates method.

6. The method of claim 4, wherein the client token comprises a SET Token and the digital certificate comprises a SLP certificate.

7. The method of claim 6, wherein the SET Token comprises a SET identity, a H-SLP identity, a D-SLP identity and a digital signature of the H-SLP.

8. The method of claim 7, wherein the SET Token further comprises a provided position of the SET.

9. The method of claim 8, wherein the D-SLP authenticates the SET by verifying that a current position of the SET is within a threshold distance of the provided position of the SET.

10. The method of claim 7, wherein the SET Token further comprises an initial time and duration of a D-SLP authorization.

11. The method of claim 10, wherein the D-SLP authenticates the SET by verifying that a current time is within the initial time and duration of the D-SLP authorization.

12. The method of claim 1, further comprising authenticating, by the client, the first server using public key authentication before transmitting the client token to the first server.

13. The method of claim 1, wherein the first server has received a digital certificate associated with the second server from a previous secure communication session between the first server and the second server, and wherein the digital certificate has been used by the first server to validate the digital signature.

14. The method of claim 1, further comprising storing, by the client, the client token until the client token is revoked by the second server.

15. The method of claim 14, wherein the client token is revoked when the client receives a new client token from the second server defined for the first server.

16. The method of claim 1, wherein the client token is used by the first server to verify inclusion of the first server's own identity.

17. A client for obtaining a secure connection with a first server, the client comprising:
one or more processors; and
memory storing computer-readable instructions that, when executed by the one or more processors, cause the client to:
establish a secure communication session between a second server and the client, wherein the second server is trusted by the first server, wherein the second server is configured to authenticate the client, and wherein the secure communication session is established directly between the second server and the client;
receive a client token using the secure communication session, wherein the client token is defined for the first server and comprises (i) data identifying the first server, the second server, and the client, and (ii) a digital signature of the second server;
receive a digital certificate using the secure communication session, the digital certificate comprising information to enable authentication of the digital signature to the first server;
request secure communication access to the first server, wherein the request includes transmitting a message comprising the client token and the digital certificate to the first server via a temporary communication access accepted by the first server;
and receive a grant of secure communication access to the first server based on authentication of the client by the first server, wherein the authentication is based on the client token validating the client, the digital signature validating the client token, and the digital certificate validating the digital signature, and wherein the grant of secure communication access that was received was based at least in part on the first server having obtained a location of the client and having transmitted the location of the client to an external client.

18. The client of claim 17, wherein the transmitting of the digital certificate to the first server occurs only once, and the digital certificate is sent in an initial access message from the client to the first server.

19. The client of claim 17, wherein the client token and digital certificate comprise bit strings, and the client token and digital certificate are not encoded or decoded by the client.

20. The client of claim 17, wherein the second server comprises a home secure user plane location (SUPL) location platform (H-SLP), the client comprises a SUPL Enabled Terminal (SET) and the first server comprises a Discovered SLP (D-SLP).

21. The client of claim 20, wherein the client token comprises a SET Token and the digital certificate comprises a SLP certificate.

22. The client of claim 21, wherein the SET Token comprises a SET identity, a H-SLP identity, a D-SLP identity and a digital signature of the H-SLP.

23. The client of claim 22, wherein the SET Token further comprises a provided position of the SET.

24. The client of claim 22, wherein the SET Token further comprises an initial time and duration of a D-SLP authorization.

25. The client of claim 17, further comprising computer-readable instructions that, when executed by the one or more processors, cause the client to authenticate the first server using public key authentication before the transmission of the client token to the first server.

26. The client of claim 17, further comprising memory configured to store the client token until the client token is revoked by the second server.

27. The client of claim 26, wherein the client token is revoked when the client receives a new client token from the second server defined for the first server.

28. One or more non-transitory computer-readable media storing computer-executable instructions for obtaining a secure connection between a first server and a client that, when executed, cause one or more computing devices included in the client to:
establish a secure communication session between a second server and the client, wherein the second server is trusted by the first server, wherein the second server is configured to authenticate the client, and wherein the secure communication session is established directly between the second server and the client;
receive a client token using the secure communication session, wherein the client token is defined for the first server and comprises (i) data identifying the first server, the second server, and the client, and (ii) a digital signature of the second server;
receive a digital certificate using the secure communication session, the digital certificate comprising information to enable authentication of the digital signature to the first server;
request secure communication access to the first server, wherein the request includes transmitting a message comprising the client token and the digital certificate to the first server via a temporary communication access accepted by the first server;
and receive a grant of secure communication access to the first server based on authentication of the client by the first server, wherein the authentication is based on the client token validating the client, the digital signature validating the client token, and the digital certificate validating the digital signature, and wherein the grant of secure communication access that was received was based at least in part on the first server having obtained a location of the client and having transmitted the location of the client to an external client.

29. An apparatus for obtaining a secure connection between a first server and a client, the apparatus comprising:
- means for establishing a secure communication session between a second server and the client, wherein the second server is trusted by the first server, wherein the second server is configured to authenticate the client, and wherein the secure communication session is established directly between the second server and the client;
- means for receiving, by the client, a client token using the secure communication session, wherein the client token is defined for the first server and comprises (i) data identifying the first server, the second server, and the client, and (ii) a digital signature of the second server;
- means for receiving, by the client, a digital certificate using the secure communication session, the digital certificate comprising information to enable authentication of the digital signature to the first server;
- means for requesting, by the client, secure communication access to the first server, wherein the requesting includes transmitting a message comprising the client token and the digital certificate to the first server via a temporary communication access accepted by the first server;
- and means for receiving, by the client, a grant of secure communication access to the first server based on authentication of the client by the first server, wherein the authentication is based on the client token validating the client, the digital signature validating the client token, and the digital certificate validating the digital signature, and wherein the grant of secure communication access that was received was based at least in part on the first server having obtained a location of the client and having transmitted the location of the client to an external client.

30. The apparatus of claim 29, wherein the transmitting of the digital certificate to the first server occurs only once, and the digital certificate is sent in an initial access message from the client to the first server.

31. The apparatus of claim 29, wherein the client token and digital certificate comprise bit strings, and the client token and digital certificate are not encoded or decoded by the client.

32. The apparatus of claim 29, wherein the second server comprises a home secure user plane location (SUPL) location platform (H-SLP), the client comprises a SUPL Enabled Terminal (SET) and the first server comprises a Discovered SLP (D-SLP).

33. The apparatus of claim 32, wherein the client token comprises a SET Token and the digital certificate comprises a SLP certificate.

34. The apparatus of claim 33, wherein the SET Token comprises a SET identity, a H-SLP identity, a D-SLP identity and a digital signature of the H-SLP.

35. The apparatus of claim 34, wherein the SET Token further comprises a provided position of the SET.

36. The apparatus of claim 34, wherein the SET Token further comprises an initial time and duration of a D-SLP authorization.

37. The apparatus of claim 29, further comprising means for authenticating the first server using public key authentication before transmitting the client token to the first server.

38. The apparatus of claim 29, further comprising means for storing the client token until revoked by the second server.

39. The apparatus of claim 38, wherein the client token is revoked when the client receives a new client token from the second server defined for the first server.

* * * * *